United States Patent [19]

Nakamura et al.

[11] Patent Number: 5,234,802
[45] Date of Patent: Aug. 10, 1993

[54] METHOD FOR PROCESSING A SILVER HALIDE PHOTOGRAPHIC MATERIAL AND LIGHT-SENSITIVE MATERIAL FOR PHOTOGRAPHING

[75] Inventors: Takashi Nakamura; Toshio Kurokawa; Keisuke Shiba; Noboru Sasaki; Ken Kawada; Kouichi Sasaki, all of Kanagawa, Japan

[73] Assignee: Fuji Photo Film Co., Ltd., Kanagawa, Japan

[21] Appl. No.: 697,561

[22] Filed: May 9, 1991

[30] Foreign Application Priority Data

May 9, 1990 [JP] Japan ................. 2-119254
May 24, 1990 [JP] Japan ................. 2-134390

[51] Int. Cl.$^5$ ............................. G03C 5/26
[52] U.S. Cl. ................. 430/403; 430/357; 430/496; 430/501; 430/939; 354/91; 354/92; 354/324
[58] Field of Search ........... 430/357, 401, 403, 404, 430/495, 496, 499, 500, 501, 939; 354/89, 90, 91, 92, 275, 316, 320, 323, 324, 338, 339, 345

[56] References Cited

U.S. PATENT DOCUMENTS

| | | | |
|---|---|---|---|
| 790,532 | 5/1905 | Shaw | 354/323 |
| 854,026 | 5/1907 | Brownell | 354/323 |
| 1,398,423 | 11/1921 | Dye | 354/345 |
| 1,621,291 | 3/1927 | Unger | 354/345 |
| 1,853,553 | 4/1932 | Davidge | 354/340 |
| 1,898,783 | 6/1932 | Malcolm | 354/330 |
| 2,056,298 | 10/1936 | Schnelz | 354/341 |
| 2,190,754 | 2/1940 | Carleton | 354/338 |
| 2,334,952 | 11/1943 | Perbal | 354/338 |
| 2,359,611 | 10/1944 | Bolsey | 354/338 |
| 2,982,195 | 5/1961 | Nicolini | 354/341 |
| 3,565,626 | 2/1971 | Craig et al. | 430/403 |
| 4,445,768 | 5/1984 | Gold | 430/501 |

FOREIGN PATENT DOCUMENTS 2180524 11/1973 France .
685474 3/1950 United Kingdom .

Primary Examiner—Hoa Van Le
Attorney, Agent, or Firm—Sughrue, Mion, Zinn, Macpeak & Seas

[57] ABSTRACT

A method for processing a silver halide photographic material is disclosed, comprising a support and a light-sensitive silver halide emulsion layer provided on the frontside of the support, said photographic material being arranged in a processing container containing a processing solution to form a gap or series of continuous gaps adjacent to the surface of the light-sensitive layer between the frontside of the photographic material and the backside of the same photographic material, or between the frontside of the photographic material and a second photographic material, or between the frontside of the photographic material and a light-insensitive member, said gap or continuous series of gaps having a substantially constant gap width, comprising the steps of introducing a processing solution stream into each gap and replacing the processing solution thus introduced in an amount at least equivalent to the capacity of the gaps. A light-sensitive material for photographing is also disclosed, comprising a support in the form of a long roll size having provided thereon at least one photosensitive silver halide emulsion layer, said light-sensitive material having plural intermittent projections at both the left and right hand parallel margin portions along the lengthwise direction of the light-sensitive material. The light-sensitive material for photographing is well adapted for the processing method of the present invention.

15 Claims, 14 Drawing Sheets

METHOD FOR PROCESSING A SILVER HALIDE PHOTOGRAPHIC MATERIAL AND LIGHT-SENSITIVE MATERIAL FOR PHOTOGRAPHING

FIELD OF THE INVENTION

The present invention relates to a method for processing a silver halide color and black and white photographic materials, and more particularly to an improved method for processing a photographic light-sensitive material which consistently provides stable photographic performance using small amounts of processing solutions.

Furthermore, the present invention relates to photographic light-sensitive materials for photographing or for camera use, such as photographic negative films, photographic positive films, etc.

BACKGROUND OF THE INVENTION

An imagewise exposed silver halide photographic material (hereinafter referred to as "photographic light-sensitive material" or "photographic material") is processed by the steps of color development, desilvering, washing, stabilization, etc. For the color developing process, a color developer is used. For the desilvering process, a bleach solution, a fix solution, and/or a bleach-fix (blix) solution is used. For washing, tap water, well water, chemical-treated water, physically treated water, ion-exchanged water, or distilled water is used. For the stabilization process, a stabilization solution is used.

On the other hand, a black and white photographic light-sensitive material is processed using a black and white developer in place of a color developer, and then fixed and washed.

Each processing solution is generally adjusted to a temperature of from 20° C. to 50° C. A color photographic light-sensitive material or black and white light-sensitive material is processed, after imagewise exposure, by immersion in these processing solutions.

For commercial processing of photographic light-sensitive materials, there is a need to provide stable and excellent processing performance using minimal amounts of processing solution for reducing costs and manual labor, to reduce the load of pollution, to reduce the size of the processing apparatus, and to further improve the commercial value of the product.

For obtaining a stable processing performance, the composition of the processing solution must always be kept within a constant range. For obtaining excellent performance, a photographic light-sensitive material must be uniformly immersed in a sufficient amount of each processing solution to prevent uneven processing.

Accordingly, in commercial photographic processing of color photographic light-sensitive materials, an automatic processor having processing tanks each containing a larger amount of each processing solution as in a photographic laboratory or an automatic processor is designed such that upon processing of a predetermined amount of a color photographic light-sensitive material, a replenisher for replenishing each processing solution is automatically supplied to the fatigued processing solution to maintain the composition of each processing solution contained in the tank within a constant range.

Such a continuous replenishing system provides good results in the case of processing a large amount of color photographic material in a predetermined amount each day. In the system, a replenisher is supplied in proportion to the processed amount of color photographic light-sensitive material. When the processing amount of the color photographic material is relatively small, the change in concentration of components of the processing solutions by the evaporation of water and air oxidation, decomposition, etc., exceeds consumption (due strictly to processing of the photographic material). Thus, by adding a replenisher based on the processed areas of the color photographic material, the composition of the processing solution can not be kept within the desired composition range such that stable and excellent processing performance is not obtained.

Recently, with the variety of consumers, preferences, the requirement of obtaining color prints as quick as possible, and the requirement of offering color photographic processing as a secondary service, photographic processing of photographic light-sensitive materials is quickly turning from concentrated processing in a large-scale laboratory to dispersed-type small quantity processing, and additional small quantity quick processing by mini-laboratories or by other small compact processors. Particularly, in the latter low utilization processing, the above-described disadvantages in the continuous replenishing system are pronounced.

On the other hand, there is also a similar tendency in the processing of black and white photographic light-sensitive materials, and particularly, in replenishing processing by a small-sized processor and additionally in low utilization processing employing replenishing processing by a small-sized rapid processor. The disadvantages in the continuous replenishing system are also pronounced as in the case of color processing.

As a method of solving the above-described problems, there are proposed (1) a method of properly using two kinds of replenishers, i.e., replenishing a replenisher according to the processed amount of the photographic light-sensitive material, and replenishing with another replenisher to compensate for the deterioration of the processing solution with the passage of time (e.g., by the evaporation of water, the oxidation and decomposition of components of the processing composition and the fatigue of processing solution with the passage of time) as described, e.g., in JP-A-56-1054 and JP-A-58-44438, (2) a method of automatically setting the amount of the replenisher based on the finished state of processed control strips as descried in JP-A-60-48042 and JP-A-60-133450, (3) a method of adding "Fuji Reviving Solution", a replenisher made by Fuji Photo Film Co., Ltd., when a smaller amount of a photographic light-sensitive material is being processed, (4) a method of increasing the amount of replenisher, and (5) a method of replacing all of the processing solution with a fresh processing solution when the fatigue of the processing solution can not be recovered by a replenisher alone.

However, the method (1) requires two kinds of replenishing solutions and additional processing space, requiring increased work in the preparation of replenishing solutions and increased processing space. The replenishing method (1) is complicated because two kinds of replenishers are provided such that it is difficult to efficiently practice the method in terms of labor and time.

Also, since the method (2) requires a concentration measuring device and a computer for feed back of the measured result to adjust the replenishing amount and software for operating the computer, which equipment is very expensive, there are limitations on the method with respect to economy and space for implementing these devices.

The method (3) requires additional chemicals as well as experience as to the time and the amount of addition of the replenisher such that it is difficult to practice this method.

In the method (4), the increase in the amount of chemicals results in increased costs. Also, an experience is required regarding the time and the amount of addition of the chemicals, such that it is difficult and unattractive to practice this method. Furthermore, even by applying this method, sufficient correction is not obtained. When a small amount of the photographic light-sensitive material is processed, the method does not provide good results.

Although the method (5) is readily practiced, the processing solutions are always replaced in the case of low utilization processing, such that the method is not cost effective.

On the other hand, as a method of reducing the change in the content of the components of the processing solutions in low utilization processing, there is proposed a method of processing with a slit-type processor, i.e., a processor which reduces the amount of processing solution and reduces the area of the interface between each processing solution and the ambient air as described in JP-A-63-131138, JP-A-63-259662, JP-A-63-259661, and JP-U-63-148944 (the term "JP-U" as used herein means an "unexamined published Japanese utility model application").

However, in the above described method, the photographic light-sensitive material being processed must pass through a slit-form liquid passageway. Hence, as the amount of the processing solution is reduced, the processor size is reduced. It then becomes increasingly difficult to surely transport the photographic light-sensitive material, such that this method has not yet been practically used.

As a method for processing a photographic light-sensitive material with a small amount of processing solution, there are known (1) a process of processing with a viscous developer, (2) drum development processing, (3) round tank development processing by a Nikor-type developing tank, and (4) a processing by processing device "Darkless" (manufactured by Fuji Photo Film Co., Ltd.). In these methods, a so-called disposable processing is possible since the amount of the processing solution used is relatively less. Therefore, constant photographic performance can be obtained.

However, as to the method (1) described above, as a method of processing by applying a viscous processing composition onto an imagewise exposed photographic light-sensitive material, a diffusion transfer photographic processing method is known. In this method, for uniformly applying the processing composition to a photographic light-sensitive material, the photographic light-sensitive material must have a "dike" for preventing the processing composition from spilling from the photographic material. Even when a "dike" is provided, the processing of a photographic material having a large area is uneven. Thus, the method can be used for specific applications only.

In the method (2) described above, a photographic light-sensitive material is wound around a drum and a part of the drum is immersed in a small amount of a processing solution contained in a plate or dish disposed below the drum. However, since in this method the processing solution is brought into contact with air during processing, the processing composition tends to become oxidized, and stable processing performance is difficult to obtain.

In the method (3), an imagewise exposed photographic film is swirlingly wound around a Nikor-type reel. The Nikor-type reel having the wound film is placed in a container called a round tank, about 500 ml of a processing solution is placed in the round tank from the upper portion thereof, and the reel is turned by hand at an angle of from 30 to 60 degree at a rate of 60 r.p.m. at least 5 times for one processing, or the round tank is rotated on a rotator to perform processing. When the system is disposable batch processing and the operator has good experience, relatively stable processing performance is obtained, but too much processing solution is used for the amount of photographic light-sensitive material being processed. If in this method, the same processing solution is used repeatedly to process a number of photographic films for purposes of economy, as a matter of course, stable processing performance is not obtained.

In the method (4), when a Darkless processor made by Fuji Photo Film Co., is used, one black and white film strip (12 pictures, 20 pictures, or 24 pictures) can be processed using 8 ml of a developer and 7 ml of a fix solution. However, since in this method the film is processed in a shrinked and coiled state as a wound spring, the operator must be trained to regularly rotate the rotary axis of the processor to provide swirling.

Furthermore, on detailed evaluation of the whole processed film, it has been confirmed that the processing performance is not the same between the core side and the outer side of the rolled film and hence when the same scene is photographed, it is necessary to print the scene in the first part and the scene in the end part of the processed film strip by changing color tones.

On the other hand, photographed photographic films have hitherto been processed using an automatic processor but recently, a method of more easily and quickly processing photographic films has been developed. As an example, a method of processing a photographed film in a patrone (cartridge) containing the film (hereinafter, is referred to as cartridge development) has been proposed.

In the cartridge development, processing solutions such as a developer, a bleach solution, a fix solution, wash water, etc., are successively supplied to a long film contained in a cartridge in a wound state from one side end portion of the wound film and then the film is dried.

However, in such a cartridge development, each processing solution is passed through the wound film in which the adjacent films are in close contact with each other. Hence, portions exist wherein the processing solution is not passed, or on the contrary, larger spaces than necessary are formed between adjacent films. Thus, each processing solution is not uniformly supplied to the whole surface of the emulsion layer of the photographic film to result in uneven processing such that the technique of cartridge development is not yet satisfactory.

SUMMARY OF THE INVENTION

A first object of the present invention is to provide a method for processing a silver halide photographic material which employs reduced amounts of processing solutions to thereby minimize both cost and environmental pollution.

A second object of the present invention is to provide a method for processing a silver halide photographic material which consistently provides stable processing performance.

A third object of the present invention is to provide a method for processing a silver halide photographic material which aims for reduction in the size of a processing apparatus or processor and space necessary for the installation of the apparatus.

A forth object of the present invention is to provide a light-sensitive material for photographing having a structure which promotes the uniform supply of a processing solution to the surface of the emulsion layer of the silver halide photographic material when carrying out the above-described cartridge (patrone) development, to thereby prevent uneven processing.

The present inventors have discovered that the above-described objects are achieved by a method for processing a silver halide photographic material comprising a support and a light-sensitive silver halide emulsion layer provided on the frontside of the support, said photographic material being arranged in a processing container containing a processing solution to form a gap or series of continuous gaps adjacent to the surface of the light-sensitive layer between the frontside of the photographic material and the backside of the same photographic material, or between the frontside of the photographic material and a second photographic material, or between the frontside of the photographic material and a light-insensitive member, said gap or continuous series of gaps having a substantially constant gap width, comprising the steps of introducing a processing solution stream into each gap and replacing the processing solution thus introduced in an amount at least equivalent to the capacity of the gaps.

In a preferred embodiment of the present invention, the gap has a width of from 0.05 mm to 2 mm.

In another embodiment of the present invention, the processing solution is introduced into the gap and replaced with additional processing solution by applying a positive or negative pressure to the processing solution external to the gap.

According to yet another embodiment of the present invention, the method as described above further comprises discharging the processing solution from the processing container, supplying a second different processing solution to the processing container, introducing a processing solution stream of said second processing solution into each gap and replacing the processing solution thus introduced in an amount at least equivalent to the capacity of the gaps.

The above-described processing method which is carried out in each gap adjacent to the light-sensitive layer of the photographic material may be successively carried out for an entire sequence of processing steps, but may be applied to a single processing step while the remaining processing steps of the processing sequence are carried out by a conventional processing method Also, according to another embodiment of the present invention, a light-sensitive material is provided for photographing or in camera use comprising a support in the form of a long roll size having provided thereon at least one photosensitive silver halide emulsion layer, said light-sensitive material having plural intermittent projections at both the left and right hand parallel margin portions thereof along the lengthwise direction of the light-sensitive material.

BRIEF DESCRIPTION OF THE DRAWINGS

In FIG. 12, the photographic material is swirlingly wound to form a series of continuous gaps adjacent to the surface of the light-sensitive layer between the frontside of the photographic material and the backside of the same photographic material.

FIG. 13 illustrates an example of the silver halide photographic material of the present invention having bosses, wherein the upper

FIG. 14 shows an example of forming a series of continuous gaps adjacent to the surface of the light-sensitive layer between the frontside of the photographic material and a light-insensitive material. The upper

DETAILED DESCRIPTION OF THE INVENTION

Figure 1:
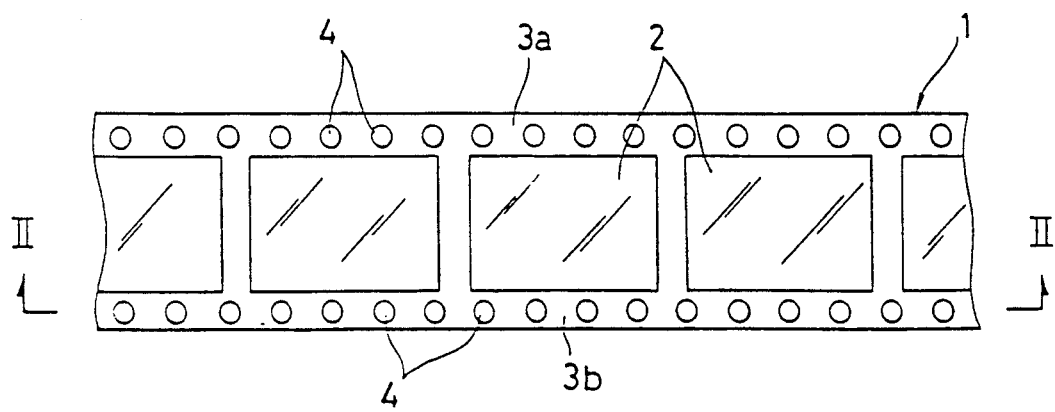
FIG. 1 is a plan view showing an example of the structure of a silver halide photographic material for photographing which can be applied to the processing method of the present invention.

The present invention is described in detail below.

A characteristic feature of a preferred embodiment of the present invention is that the amount of processing solution employed is reduced and the processing container is made compact by superposing photographic light-sensitive materials (e.g., at least two light-sensitive materials) such that a gap is formed therebetween and adjacent to the surface of the light-sensitive layer of the photographic light-sensitive material to maintain a substantially constant gap width with a substantially fixed state during the processing by supplying a processing solution to the gap to process the light-sensitive material.

The gaps of the present invention can be formed by providing projections at portions excluding image-forming portions and preferably forming periodical projections at both of the margin portions of the photographic light-sensitive material. Also, a light-insensitive member such as a light-insensitive film (e.g., sheet form, long roll form) having convex portions (projections) at both of the margin portions and a film (e.g., sheet from, long roll form) having convex and concave surfaces at both of the margin portions, which forms a gap at the image-forming surface of a photographic light-sensitive material by supporting both of the margin portions of the light-sensitive material with the projections, can be used. In this case, the light-insensitive member does not involve any elements which contribute for an image (e.g., an emulsion layer). Furthermore, by forming a narrow gap between silver halide photographic materials such as at least two light-sensitive materials, the amount of processing solution supplied to the gaps can further be reduced.

The light-sensitive film may be wound in roll form or may be superposed as plural sheet-form light-sensitive films. When sheet-form light-sensitive films are superposed, it is preferable to place the sheet films in a processing container in an arc form for keeping a constant gap with a substantially fixed state between the films.

The gap is formed having a width capable of stably supplying a processing solution, and is generally from 0.005 mm to 2 mm, preferably from 0.01 mm to 2 mm, more preferably from 0.05 mm to 2 mm, and particularly preferably from 0.05 mm to 0.5 mm.

The gap may be formed (1) by providing convex portions (projections) at both the margin portions of one surface side of a photographic light-sensitive material or (2) by inserting a light-insensitive member (a member for forming a gap) between two photographic light-sensitive materials for forming a gap between the member and the emulsion surface of each of the photographic materials.

Examples of the method (1) include a method of forming bosses at both the margin portions of a photographic light-sensitive material by pressing, heating, etc., and a method of forming waved portions at both the margin portions by pressing, heating, etc. The form of the boss may be a polyangular pyramid such as a triangular pyramid, a tetraangular pyramid, etc., a cone, a polyangular prism such as a triangular prism, a column, a wart form, a bowl form, etc.

The boss has a diameter (D) of from 0.01 mm to 2 mm, a height (H) of from 0.01 mm to 2 mm, and an interval (L) along the photographic material of less than $$40 \cos^{-1}\left(\frac{20 - H}{20}\right)$$

mm.

Preferably, $0.01 \leq H$ mm $\leq 2$ mm, and $H/5 \leq D$ mm $\leq 15H$.

Waved portions along both of the margin portions of a film may be formed by heating or pressing. The height of the wave may be from the height (H) of the boss to 2H, the interval of the waves may be from the interval (L) of the bosses to 2L, and size of the wave may be from the interval (L) of the bosses to 2L.

Examples of the method (2) include a method of forming a gap by superposing a dummy film having convex portions (projections) on both surfaces thereof (at both the margin portions only) to a photographic light-sensitive material and then swirlingly winding the assembly; and a method of using a structural material allowing for the insertion of spacers between two photographic light-sensitive materials for forming a gap along both of the margin portions of each photographic material, which gap is capable of conveying a processing solution.

In the method of rolling a dummy film together with a photographic material, the manner of forming the convex portions is same as the case of forming convex portions of the photographic light-sensitive material as described above. The form of the convex portions may be the same as those of the light-sensitive material, or from 2 to 4 times larger than the convex portions of the light-sensitive material in the height.

Figure 19:
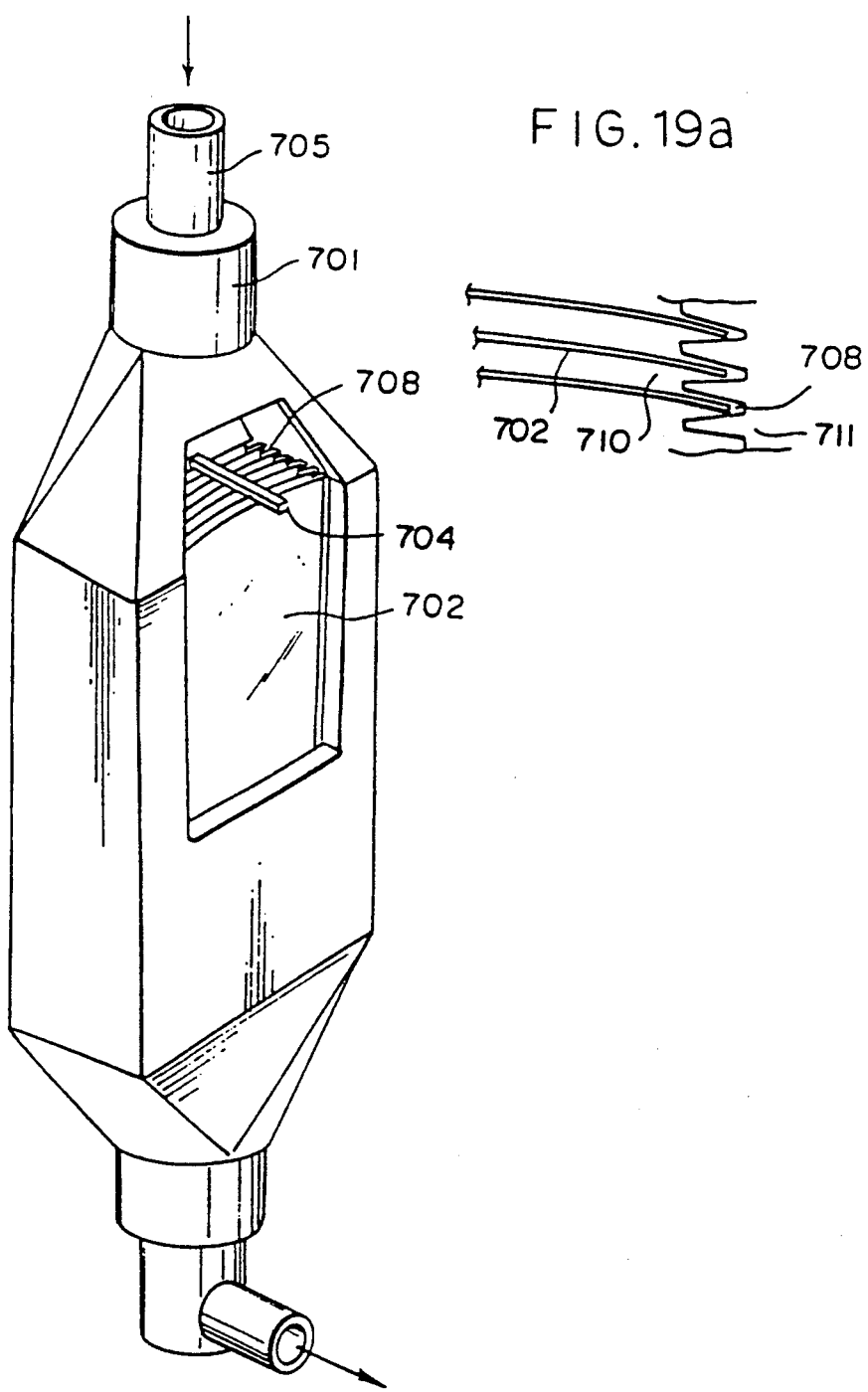
FIGS. 19 (a) and (b) are a partially cut slant view showing a processing container for industrial X-ray films in accordance with the present invention.

As a method of forming a gap by inserting spacers along both the margin portions of two light-sensitive materials (having convex portions at both surfaces thereof), a method of placing the light-sensitive materials in a frame having previously formed grooves therein or of inserting a first edge of the light-sensitive materials into the grooves of one surface side and inserting a second edge of the light-sensitive materials into the grooves of the opposite inner surface side of the container can be used (FIG. 19). The grooves may be formed, for example, by using a tooth-shaped or cone-shaped wire of about 0.5 mm in diameter.

In order to form the gap adjacent to the surface of the light-sensitive layer, the light-sensitive material(s) used in the present invention may take various forms.

Specifically, (1) in a sheet form light-sensitive material, (a) two or more thereof are arranged in parallel with a constant gap width (FIG. 18), (b) two or more thereof are arranged in an arc form with a constant gap width (FIG. 19), or (c) it is swirlingly wound to form a continuous series of gaps. Of these, (a) and (b) are generally preferred. Further, the two or more light-sensitive materials may be the same or different as long as the constant gap width is maintained. If the different silver halide light-sensitive materials are used, it is necessary that at least ½ of the number of the light-sensitive materials has a support thickness of at least 80 µm.

On the other hand, (2) in a roll form light-sensitive material, (a) it is swirlingly wound to form a continuous series of gaps (FIG. 17), (b) it is spirally and cylindrically wound to form a continuous series of gaps, or (c) two or more thereof are arranged in parallel or in an arc form with a constant gap width. Of these, (a) and (b) are preferred, since the processing is compact. If two or more light-sensitive materials are used, they may be the same or different as long as the constant gap width is maintained.

In either (1) or (2) above, when the light-sensitive material has a gap forming ability such as a boss, the gap is formed by the gap forming ability. If the light-sensitive material itself does not have the gap forming ability, the gap may be formed by an external device such as a frame provided in a processing container or by using another bossed member.

The thus formed gap preferably has a width of from 0.05 to 2 mm. When the support has a thickness of 60 μm or more, the gap formed between the light-sensitive materials or between the light-sensitive material and the light-insensitive member can be kept constantly due to the rigidity of the support. Therefore, if the gap width is over 2 mm, it is difficult to maintain the gap, and further, it is also difficult to form a constant gap width of less than 0.05 mm in the case of using a support of 80-200 μm thickness which is generally used in the art.

In the present invention, the gap or continuous series of gaps formed adjacent to the light-sensitive layer has a substantially constant width over the entire photographic material and the gap width is maintained substantially constant during the processing. The term "substantially" means that, for example, the gap width may deviate to some extent where the processing solution is supplied or the gap of a portion apart from the convex portion may deviate to some extent as compared to the vicinity of the means of fixingly forming the gap, e.g., the convex portion.

The term "some extent" means that in the light-sensitive material in the form of a long roll size, the deviation is preferably within 10L, more preferably within 6L, and particularly preferably within 3L in terms of the interval of the bosses, and in the light-sensitive material in the form of a sheet film, the deviation is preferably within 10%, more preferably within 5% of the length thereof. If the light-sensitive material is subjected to the winding and rewinding alternately within the above range of deviation, undesirable streaks caused by the bosses of the light-sensitive material or the light-insensitive member can be prevented.

Although there may be some deviation in gap width, it is important that the gap is capable of conveying a processing solution such that the processing solution may be supplied to the gap and then replaced.

The means "processing by supplying a processing solution" into the gap means that the processing solution is supplied into the gap by a supply means controlled by an external force. The supply means includes, e.g., a pump for applying positive pressure or by suction of the processing solution through the gap, or the combination thereof.

By employing the above-described means, the amount of processing solution can be considerably reduced.

The processing solution is preferably supplied to the gap by applying positive pressure (pressing) or by suction. The pressure at applying or suction varies depending on the capacity of the gaps formed adjacent to the light-sensitive surface of a silver halide photographic material and the viscosity of the processing solution, but is generally from 0.2 to 20 kg/cm$^2$, and preferably from 1 to 6 kg/cm$^2$ in absolute value.

By supplying the processing solution to the gap using applied pressure or suction, which processing from an external solution is provided external from the processing portion (processing container) as described above, stable and uniform processing is obtained. This feature of the present invention is entirely different from a conventional system using a Nikor-type processor.

A second feature of the present invention is that the processing solution in an amount of "at least equivalent to the capacity of the gaps" is replaced with processing solution external to the gaps until one step of processing is finished. The capacity of the gaps is the total sum of the capacities of each of the gaps formed adjacent to the light-sensitive surface of the photographic light-sensitive material. The replacement volume of the processing solution can be determined by comparing the amount of the processing solution supplied to the spaces forming the gaps by the light-sensitive materials or light-insensitive materials with the total capacities of the gaps.

In the present invention, the processing solution stream is passed (i.e., introduced and replaced) through each gap adjacent to the light-sensitive layer. The amount (volume) of the processing stream passed through the gaps is at least equivalent to the capacity (volume) of the gaps. The processing stream can be passed through each gap in a single direction during the processing, or the stream direction may be reversed or alternated during the processing.

The replacement volume is the amount of processing solution for a processing step that is passed through the gaps. An equivalent replacement volume is that volume equal to the capacity (volume) of the gaps. For example, in FIG. 20 when the amount of processing solution in the capacity (volume) of the processing container 804 is represented by V and the total volume of core 801 and films 802 is represented by $V_F$, the replacement volume RV is represented by the following formula: $RV = V - V_F$.

One step of processing is a processing step using a distinct processing solution.

For example, the processing of a black and white photographic light-sensitive material might include a development step, a fix step, a stop step, a stabilization step, a wash step, etc., each of which could employ a distinct process solution. The processing of a color photographic light-sensitive material might include a color development step, a fix step, a bleach step, a bleach-fix (blix) step, a reversal step, a stabilization step, a wash step, etc. It is unnecessary to replace a processing solution in an amount of at least an equivalent to the capacity of the gaps in all of the above described processing steps, but it is particularly preferred that in at least one step including a development step, the processing solution is replaced in an amount at least equivalent to the capacity of the gaps.

In the process of the present invention, the processing solution is replaced in an amount of at least an equivalent to the capacity of the gaps, preferably from one equivalent to 100 equivalents, more preferably from one equivalent to 10 equivalents, and particularly preferably from 1.2 equivalents to 6 equivalents.

When the replacement volume of the processing solution is less than the equivalent amount, the photographic performance can differ between the right side end and the left side end of the photographic material. In particular, when the exposure amount is large, the tendency is too pronounced to use such processing practically.

When the processing solution is replaced by changing the direction of the stream of the processing solution, the stream direction of a processing solution is reversed preferably at least twice, more preferably from 3 to 100 times, and particularly preferably from 4 to 10 times during the course of a single processing step. By changing the stream direction as described above, improved uniformity of the photographic images is obtained.

There is no particular limitation on how the processing solution is replaced. When, for example, a long photographic light-sensitive material is swirlingly wound, it is preferable to replace the processing solution in a direction substantially perpendicular to the lengthwise direction of the photographic light-sensitive material for efficient replacement of the processing solution. In this case, the term "substantially perpendicular" means perpendicular within ±30°. Also, in the case of processing sheet-form photographic light-sensitive materials, it is preferred to move the processing solution in the direction that the pass length of the gap is short (i.e., in the direction of the short side of the sheet) to enhance processing properties (e.g., inhibition of uneven development, etc.).

Furthermore, the replacement of a processing solution may be in a constant direction during one step of processing but may be reversed (e.g., to the opposite direction) with the passage of time. A stop step may be employed at the change of direction. To obtain uniform processing, it is preferred to change the replacement direction with the passage of time.

As described above, a processing solution is forcibly supplied to narrow gaps by a supply means without spontaneously falling of a processing solution. As a result, good photographic images are unexpectedly obtained using a small amount of processing solution. Such excellent results could not have been expected from conventional development processing in a tank system, a system of using Nikor type processor, and a system using a Darkless processor.

Also, in accordance with the process of the present invention, a photographic light-sensitive material is in the stream of a processing solution such that processing is carried out very efficiently. Namely, in accordance with the process of the present invention, a high degree of stirring of the processing solution which has not been obtained using a conventional tank development system is achieved.

A third feature of the present invention is that a reduced amount of the processing solution is supplied to a photographic light-sensitive material loaded in a processing container to efficiently carry out processing of the light-sensitive material without substantially moving the processing container. In the present invention, the photographic light-sensitive material can preferably be processed with a processing solution in an amount of at least two equivalent of the volume capacity of the gaps adjacent to the light-sensitive surface of the light-sensitive material.

In this case, the term "without substantially moving" means that a photographic light-sensitive material loaded in a processing container is not moved, for example, by shaking the container by hand as in a system using a Nikor-type processor.

However, the stirring in each step of the development processing, and particularly the stirring involving micro-vibration by supersonic waves, are rather preferably conducted in the present invention.

Also, when the process of the present invention is practiced by an automated processing apparatus, the main stream of the processing solution is preferably not generated by largely shaking or vibrating the processing container.

In the present invention, a fresh processing solution is efficiently used for processing. It has been found that in the process of the present invention, the processing solution is efficiently used, that is, the amount of the processing solution is reduced. Furthermore, the process of the present invention provides excellent processing stability and a surprising increase in the sensitivity and improved image graininess of a photographic light-sensitive material when the processing solution is a developer.

Practical examples of the processing container for use in accordance with the process of the present invention are shown in FIGS. 16 to 20, but the processing container for use in the present invention is not limited thereto. Details of these containers are described below.

The processing method of the present invention is preferably applied to a light-sensitive material for photographing or in camera use. As the light-sensitive material for photographing, the following light-sensitive materials (1), (2), and (3) are preferred.

(1) A light-sensitive material for photographing in the form of a long roll size having plural intermittent projections at both the parallel right and left hand margin portions of the light-sensitive material along the lengthwise direction.

(2) A light-sensitive material for photographing as in (1), wherein plural parallel lines of projections are formed in at least one margin portion of the light-sensitive material along the lengthwise direction.

(3) A light-sensitive material for photographing as in (1) or (2), wherein the above-described projections are formed from deformations of the support of the light-sensitive material.

Also, in the light-sensitive material for photographing described in above (2), it is preferred that the projections (bosses) are alternately disposed in at least two lines.

Furthermore, in any of the above-described light-sensitive materials for photographing, it is preferred that the projections at one margin portion and the projections at the other margin portion of the light-sensitive material are disposed symmetrically with one other.

The above described light-sensitive material for photographing which is well adapted for processing in accordance with the present invention can be processed in a wound state by passing a processing solution in the width direction of the light-sensitive material from one end side portion to the other end side portion.

In this case, the projections formed at both the margin portions of the light-sensitive material for photographing function as a spacer for maintaining constant a gap of the desired width between the adjacent light-sensitive materials in a wound state.

Accordingly, the processing solution flowing through the gaps is uniformly supplied to the surface of the silver halide emulsion layer of the light-sensitive material for photographing, to thereby prevent uneven processing.

The light-sensitive material for photographing which is well adapted for processing in accordance with the processing process of the present invention is explained in detail below based on the preferred embodiments shown in the accompanied figures.

Figure 2:
FIG. 2 is a sectional view along the II—II line of FIG. 1.

FIG. 1 is a plan view of a light-sensitive material for photographing which is well adapted for processing in accordance with the present invention, and FIG. 2 is a sectional view taken along the line II—II of FIG. 1.

As shown in FIGS. 1 and 2, the photographic film 1 is in the form of a long roll having latent image portions 2.

Also, at both side portions of the image portions 2, that is, at both the parallel margin portions 3a and 3b, projections 4 are formed along the lengthwise direction of the film 1.

In the example shown in FIG. 1 and FIG. 2, the cross section of the projection 4 has a round mountain shape. The projections 4 are intermittently formed in a periodic interval, preferably the same interval, along the lengthwise direction of the film.

In addition, the projections are formed at the same surface, that is, either the emulsion layer surface or the back surface (base surface) of the film 1.

When the film 1 is wound, the tips of the projections 4 formed at the base surface side are brought into contact with the emulsion layer surface such that even flow of processing solution is facilitated at the emulsion layer surface to prevent the occurrence of uneven processing. Furthermore, when the film 1 is loaded in a camera, the operation is convenient.

On the other hand, one reason for forming the projections 4 at the emulsion layer side is that it is easy to form such projections.

It is preferable that such projections are formed from deformations of the support of the film 1 itself from the viewpoints of facility of the production and low cost. That is, as shown in FIG. 2, the projections 4 of the film 1 are formed by press molding or press heating molding of the film 1. In this case, the projections are formed preferably after coating the emulsion layer(s) on the support of the film 1. Furthermore, the projections 4 may be formed after photographing the film 1 and before processing the film.

Figure 3:
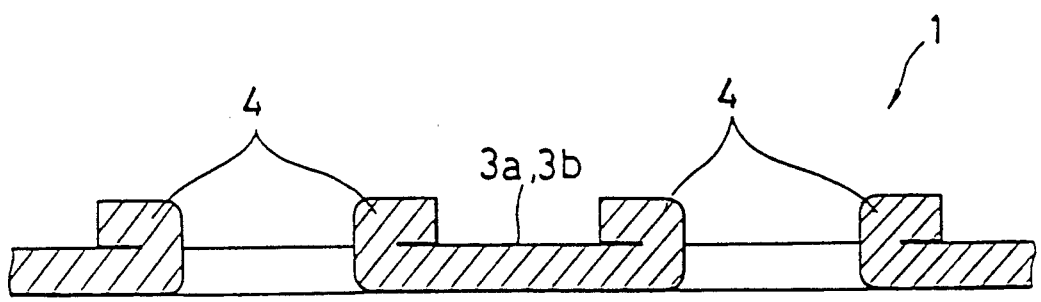
FIG. 3 and FIG. 4 each is a sectional side view showing an example of the structure of the projection (boss).

Also, as an example of another method of forming the projections 4 from the film 1 itself as shown in FIG. 3, margin portions 3a and 3b are cut at predetermined positions and having a predetermined size, which projections 4 are then formed by bending the cut.

Figure 4:
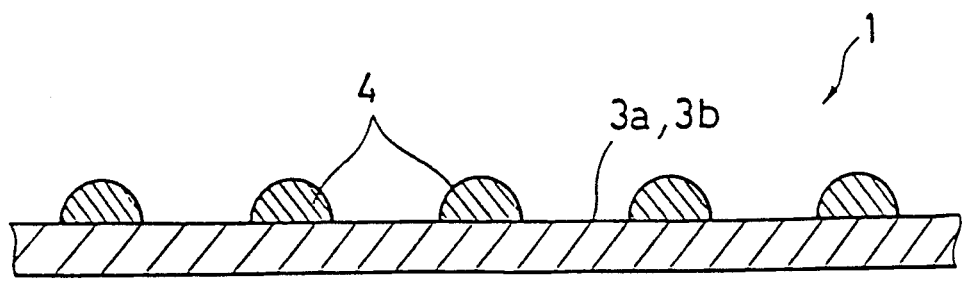

Also, as a further example of a method of forming projections 4 as shown in FIG. 4, a coating composition is applied to the surface of the margin portions of the film 1 to obtain a desired pattern and then solidified to form the projections 4.

Useful coating agents for forming such projections, include hot melt series coating agents such as polyamide, polyester, etc.; room-temperature curing type rubbers such as silicone, etc.; reaction setting type resins such as elastomers, epoxy resins, polyurethane, etc.; thermosetting type resins; ultraviolet ray setting type resins such as polyester acrylate, etc.

Also, the method of forming the projections 4 is not limited to the above-described methods and, for example, an embossing method, a compressive boring method, an etching method, a soldering method, etc., may also be used.

There is no particular limitation regarding the composition of the support of the film 1. Useful support materials include polyester, polyethylene polypropylene, polyimide, polyamide, polyethylene terephthalate (PET), TAC, POM, teflon, ABS resins, and a laminate of two or more of these materials. Of these materials, PET and TAC (triacetyl cellulose) are preferred.

Also, there is no particular limitation regarding the thickness of the support of the film 1. The support preferably has a thickness of from 0.05 to 1 mm, and particularly preferably from 0.1 to 0.2 mm.

Figure 11:
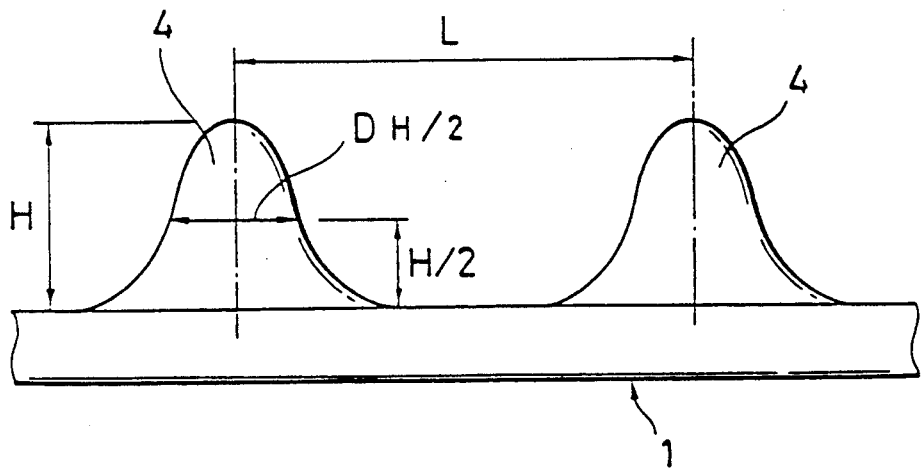
FIG. 11 is an enlarged side view illustrating the size of the projection.

Next, the size of the projections 4 is explained by referring to FIG. 11.

There is no particular restriction on the size of the projections 4, but the following range is preferred.

The height H of the projection 4 shown in FIG. 11 is preferably from about 0.01 to 1 mm, and particularly preferably from about 0.1 to 0.3 mm. The height H of the projections 4 sets the gap distance of the gap 7 of the roll 5 described below. If the height H is less than 0.01 mm, it is difficult to pass the processing solution through the gaps, while if the height H is over 1 mm, the selection and working of the film support becomes difficult.

The diameter $D_{H/2}$ of the projection 4 at the half height H/2 is preferably from about 0.005 to 8 mm, and particularly preferably from 0.15 to 0.5 mm.

If the $D_{H/2}$ is less than 0.005 mm, the strength of the projection is weak such that when the film 1 is wound, the film tends to adhere to itself at adjacent portions, and if $D_{H/2}$ is over 8 mm, the area of the margin portions 3a and 3b is unnecessarily increased to reduce the area of the image portion 2.

Figure 9:
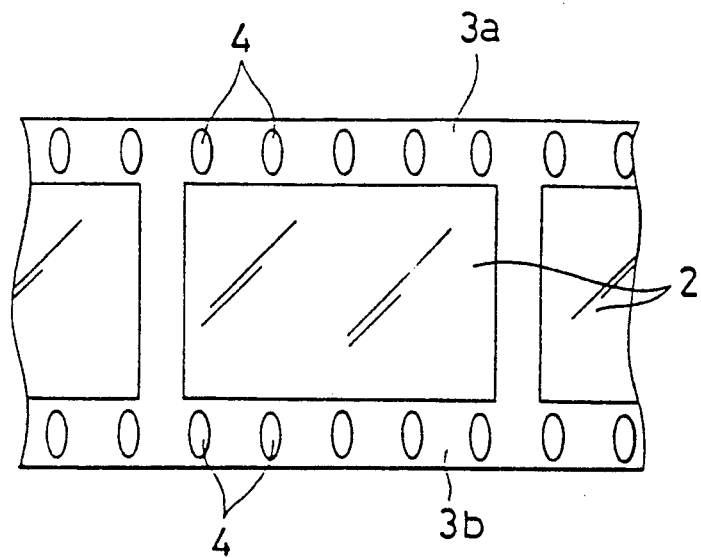
Figure 10:
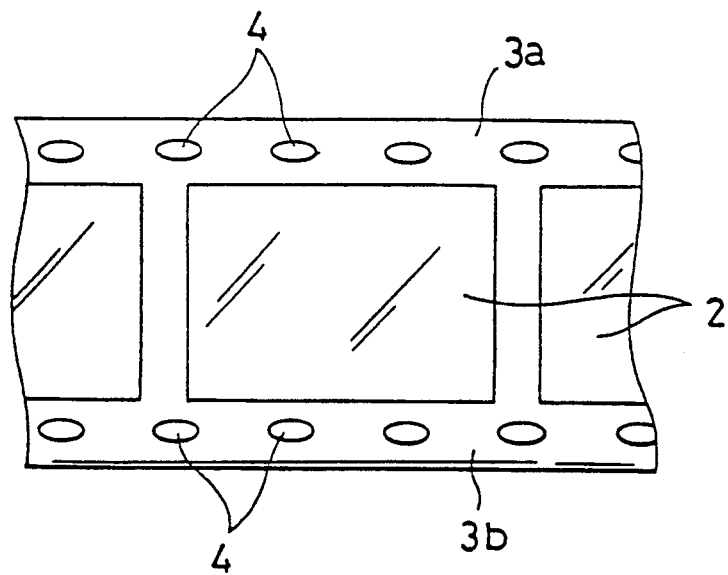

In addition, as will be described below, when the form of the cross section of the projection 4 is an ellipse (as shown in FIG. 9 and FIG. 10), the ratio of the long diameter to H/2 of the height may be in the range described above. In other cross sectional forms, the maximum length of the cross section to H/2 of the height may also be in the above described range.

Also, the mean interval L between each adjacent projections 4 along the lengthwise direction of the film 1 is preferably from about 0.005 to 20 mm, and particularly preferably from about 1 to 10 mm.

Figure 12:
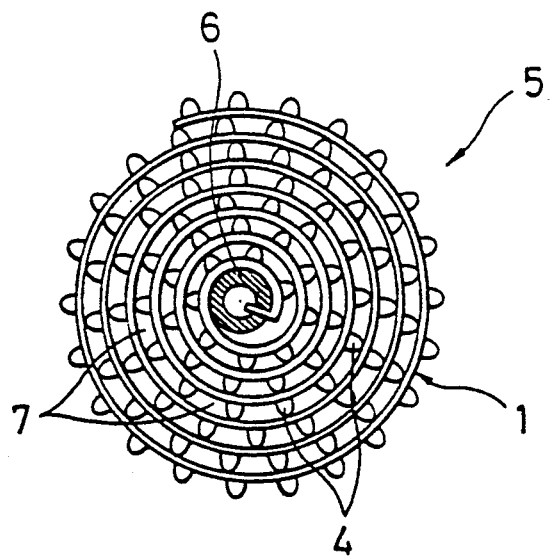
FIG. 12 is a side view showing the state of processing a silver halide photographic material for photographing which is preferably applied to the processing method of the present invention.

If the interval L is less than 0.005 mm, it becomes difficult to pass a processing solution between the adjacent projections and if the interval L is over 20 mm, the film of the portion not supported by the projections 4 is bent in the roll 5 of the film 1 as shown in FIG. 12, such that the gap interval 7 is not kept constant.

FIG. 12 is a sectional side view of a roll 5 of the film 1. As shown in FIG. 12, an end of film 1 is fixed to a core 6, the film 1 is spirally wound to form a roll 5, which roll 5 is placed in a cartridge or other processing container (not shown), and each of processing solutions such as a developer, a bleach solution, a fix solution, wash water, etc., is passed, in succession, from one side end portion of the roll 5 to the other side end portion thereof.

The processing solution flows in the width direction (the perpendicular direction of the paper surface of FIG. 12) of the film 1 through the gaps formed between each of the adjacent films 1, such that the processing solution is brought into contact with the surface of the emulsion layer of the film 1 to process the film.

Since the width of the gaps 7 are kept substantially constant by the projections 4 over the entire film 1, the processing solution is uniformly supplied to the entire surface of the emulsion layer and uneven processing is prevented.

FIGS. 5 to 10 each is a plan view of a film showing an example of the pattern of the projections 4.

Figure 5:
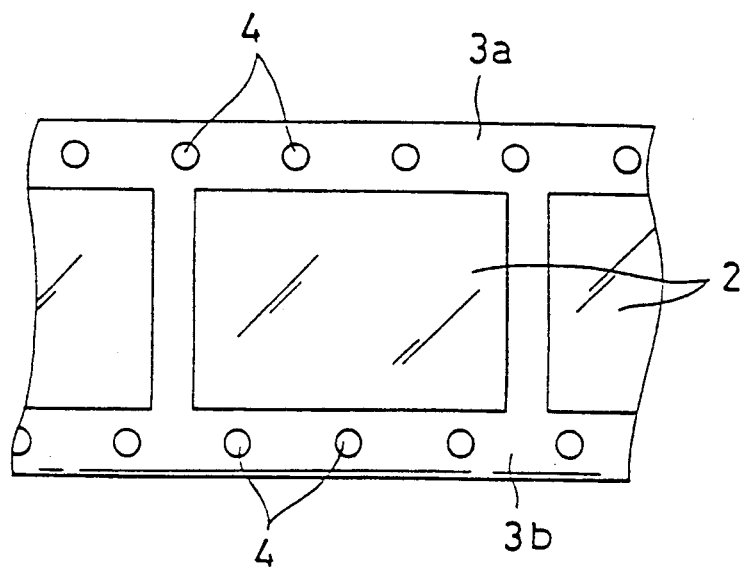
FIG. 5, FIG. 6, FIG. 7, FIG. 8, FIG. 9, and FIG. 10 each is a plan view showing an example of the disposed pattern of projections.

In the pattern of the projections 4 shown in FIG. 5, projections 4 are formed along one line at each of the margin portions 3a and 3b, and the projections at the margin portion 3a and the projections 4 at the margin portion 3b are disposed alternately with each other. By employing such a construction, the stream of the processing solution is dispersed to prevent uneven processing.

Figure 6:
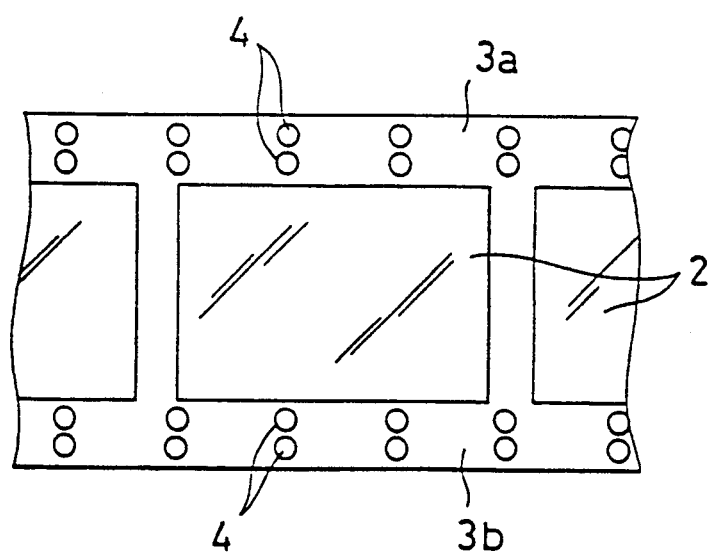
Figure 7:
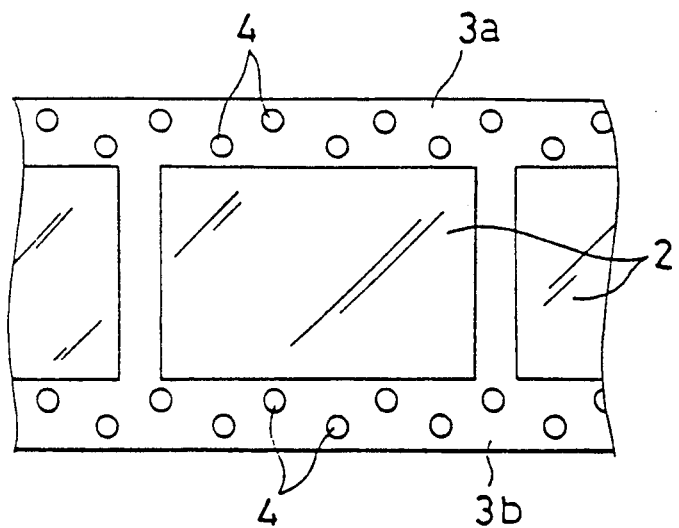
Figure 8:
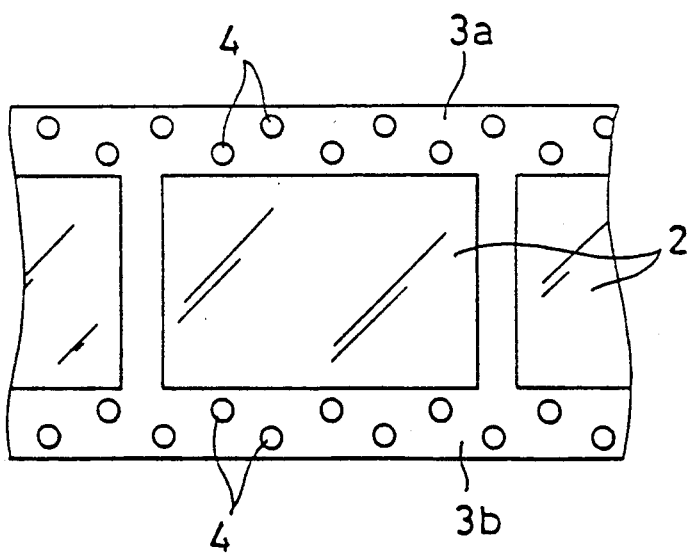

The patterns of projections 4 shown in FIG. 6, FIG. 7, and FIG. 8 are formed along two lines at each of the margin portions 3a and 3b.

By employing the above described construction, the reinforcing effect for the projections 4 is increased. Namely, when the film 1 is wound, this reinforcing effect prevents the collapse of the projections 4 and the bending of the film 1 such that contact of the emulsion layer surface with the base surface is prevented. In particular, when the film 1 of the roll 5 is wound tightly, the above-described problem does not occur and the gaps 7 are kept constant.

In the construction shown in FIG. 6, the projections 4 formed along four lines at the margin portions 3a and 3b are disposed in the same width direction of the film. In this case, the projections 4 may be disposed alternately at the margin portion 3a and the margin portion 3b as shown 5.

Also, in the construction of FIG. 7, the projections 4 formed along two lines at each margin portion (e.g., margin portion a) are disposed alternately, and the projections 4 of the same pattern are formed at the other margin portion (margin b).

Furthermore, in the construction of FIG. 8, the pattern of the projections 4 formed at the margin portion 3a is same as the above-description construction in FIG. 7, but the pattern of the projections 4 formed at the margin portion 3b is symmetrical with the projection pattern at the margin 3a to the center line in the lengthwise direction of the film 1.

In the constructions shown in FIGS. 7 and 8, the stream of the processing solution is further dispersed such that the effect of preventing uneven processing is enhanced as compared with the construction shown in FIG. 6. In particular, in the construction of FIG. 8, since the pattern of the projections 4 at the margin portion 3a is symmetrical with the pattern of the projections 4 at the margin portion 3b, uneven processing not to occur regardless of the direction of flow of the processing solution (i.e., from the margin portion 3a side or the margin portion 3b side), such that the subject construction is suitable for processing a light-sensitive materials by changing the flow direction of the processing solution in a series of processing steps.

The projections 4 shown in FIG. 9 and FIG. 10 exemplify a cross section of the projection 4 other than a circle. That is, the cross section of the projection 4 shown in FIG. 9 is an ellipse wherein the long axis thereof is in the width direction of the film 1 and the cross section of the projection 4 shown in FIG. 10 is an ellipse wherein the long axis is in the lengthwise direction of the film 1.

The construction shown in FIG. 9 is useful for preventing adjacent films from approaching or contacting each other by above-described bending of the film. Also, the construction shown in FIG. 10 is useful for dispersing the stream of the processing solution to a high degree.

In addition, the form of the cross section of the projection 4 is not limited to a circle and ellipse, but may take other forms such as a triangle, a square, or other polygons.

Also, two or more kinds of projections each having a different sectional form may be formed on the same film.

In the present invention, the pattern of the projections 4 are not limited to those shown in FIG. 1 and FIGS. 5 to 10. For example, the pattern of the projections may be appropriately combined, projections may be irregularly disposed, or the projections may have a construction other than described above.

In addition, the film 1 shown in each figure does not have perforations; however, in the present invention, the film may have or may not have perforations.

Also, when the film 1 has perforations, there is no particular restriction on the positional relation of the perforations and the projections.

Furthermore, when the film 1 does not have perforations, the projections 4 can be utilized as a means for winding the film 1.

The light-sensitive material for photographing for use in the present invention comprises a support composed of PET, TAC, etc., as described above having thereon at least one light-sensitive silver halide emulsion layer on one surface of the support.

Also, if necessary, an antihalation layer may be formed on the emulsion layer side or the opposite side of the support, and when the light-sensitive material comprises two or more silver halide emulsion layers each having a different light sensitivity, an interlayer can be formed between them, and one or more protective layer(s) may be formed on the surface of the uppermost emulsion layer.

The use of the above-described projections is particularly effective for photographic processing of a light-sensitive material for photographing having layers composed of such light-sensitive silver halide emulsions.

There is no particular restriction on the kind of light-sensitive material for photographing which can be processed in accordance with the present invention, which light-sensitive materials include color negative photographic films, color reversal photographic films, color positive photographic films, black and white photographic films, micro films, motion picture films, etc.

Also, there is no particular restriction on the size of the photographic film for processing in accordance with the present invention, which films include those of 135 mm size, and 110 mm size, etc., as well as other sizes.

When a light-sensitive material for photographing such as a photographic light-sensitive film is processed by supplying a processing solution from one side thereof in a roll state of the film, the gap between the adjacent films being kept constant by means of the projections, the processing solution is uniformly supplied to the surface of the emulsion layer of the film such that uneven processing is prevented.

By employing the light-sensitive material for photographing to the method of the present invention, it becomes practical to process the light-sensitive material in a processing container having a very small volume or capacity.

For example, the volume of the processing container is from 200 ml to 3000 ml, preferably from 300 ml to 1500 ml, and more preferably from 300 ml to 800 ml per unit area (1 square meter) of the light-sensitive material being processed. In the process of the present invention, by using such a small processing container, good photographic images with high sensitivity and gamma are obtained. The process of the present invention provides excellent uniformity of processing, reproducibility, and a smaller difference in photographic performance is observed in the lengthwise direction of the processed film as compared to the case of using, for example, the Darkless processor kit, made by Fuji Photo Film., Co.

Also, when the process of the present invention is applied to a light-sensitive material for photographing, the photographic light-sensitive material can be processed by using a very compact processing container having a volume of from 5 ml to 100 ml, and preferably from 8 ml to 60 ml. In particular, a columnar processing container which can contain a long roll photographic light-sensitive material in a swirlingly wound form is preferred.

In the processing process of the present invention, a cartridge (patrone) can be used as the processing container. Namely, a cartridge containing the photographic light-sensitive film of the present invention (i.e., a roll film with gaps between adjacent films) is loaded in a camera. After imagewise exposing the photographic film contained in the cartridge, the film is rewound in the same cartridge and is then unloaded from the camera and used for processing by passing each processing solution through the roll film in the cartridge.

Alternatively, an ordinary cartridge containing the photographic light-sensitive film of the present invention is loaded in a camera. After imagewise exposing the photographic film, the photographic film once rewound in the cartridge is wound in the dark in a processing container for use in the present invention in the dark, and the film is then processed in the processing container as described above.

The processing container for use in the present invention may be equipped with a pressing or holding member for the film roll, a passageway for the film, and a turning sendback means for spooling.

According to the process of the present invention, the amount of each processing solution per unit area of the photographic light-sensitive material being processed is greatly reduced. For example, the light-sensitive material can be processed by a small amount of each processing solution of from 300 to 1500 ml, and particularly from about 300 to 800 ml per square meter. For example, in the case of a developer, the amount required for processing is from 300 to 800 ml; in the case of a bleach solution, the amount is from 200 to 500 ml; in the case of a fix solution, the amount is from 300 to 800 ml; and in the case of wash water or a stabilization solution, the amount is from 300 to 1500 ml per square meter of the light-sensitive material being processed.

Since in the processing method of the present invention the amount of each processing solution is relatively small, the waste solution can be discharged without causing excessive environmental pollution. Also, each processing solution is more easily formulated and it becomes unnecessary to consider deviation in photographic performance due to the fatigue of the processing solution. Furthermore, the management of processing is greatly simplified. Accordingly, the design of an automatic processor is likewise simplified and maintenance of the processor is facilitated.

For the at least one photographic silver halide emulsion layer of the photographic light-sensitive material of the present invention, silver bromide, silver iodobromide, silver iodochlorobromide, silver chlorobromide, or silver chloride may be used as the silver halide.

The mean grain size of the silver halide grains (when the grains are sphere or near sphere, the mean grain size is the diameter of the grain and when the grains are cubic grains, the grain size is the side length and the mean grain size is shown by the mean value based on the projected area of the grains) constituting the photographic silver halide emulsion for use in the present invention is not particularly limited, and the grain size distribution may be narrow or broad.

The silver halide grains constituting the at least one photographic emulsion layer of the light-sensitive material of the present invention may have a regular crystal form such as a cubic form and an octahedral form, an irregular crystal form such as a sphere, a tabular form, etc., or a composite form of these crystal forms.

Also, the silver halide grains may be composed of a different phase between the inside and the surface portion thereof or may be composed of a homogeneous phase.

Furthermore, the silver halide grains may be of the type which forms a latent image mainly on the surface of the grains or of the type which forms a latent image mainly in the inside of the grains.

The photographic silver halide emulsions for use in the present invention can be prepared using the methods described in P. Glafkides, *Chimie et Physique Photographique*, published by Paul Montel, 1967, G. F. Duffin, *Photographic Emulsion Chemistry*, published by the Focal Press, 1966, V. L. Zelikman et al, *Making and Coating Photographic Emulsion*, published by the Focal Press, 1964, etc.

Namely, an acid method, a neutral method, an ammonia method, etc., can be used. As a method of reacting a soluble silver salt and a soluble halide, a single jet method, a double jet method, or a combination of these methods can be used.

In the step of forming silver halide grains or physical ripening of the grains, a cadmium salt, a zinc salt, a thallium salt, an iridium salt or a complex salt thereof, a rhodium salt or a complex salt thereof, an iron salt or a complex salt thereof, etc., may be present in the system.

The silver halide emulsion for use in the present invention may be chemically sensitized. For the chemical sensitization, the methods described, e.g., in H. Frieser, *Die Grundlacender Photogaphischen Prozesse mit Silberhalogeniden*, pages 675 to 734, published by Akademische Verlagsgesellschaft, 1968 can be used.

For example, a sulfur sensitizing method using active gelatin and a sulfur containing compound which reacts with silver (e.g., thiosulfates, thioureas, mercapto compounds, and rhodanines); a reduction sensitizing method using a reducing material (e.g., stannous salts, amines, hydrazine derivatives, formamizinesulfinic acid, and silane compounds); a noble metal sensitizing method using a noble metal compound (e.g., gold complex salts and complex salts of metals belonging to group VIII of the periodic table, such as Pt, Ir, Pd, etc.); and a combination of these chemical sensitizing agents can be used.

The photographic silver halide emulsion for use in the present invention can contain various compounds for preventing the occurrence of fog during the production, storage, or photographic processing of the photographic light-sensitive material, or for stabilizing the photographic performance thereof.

For example, there are many compounds known as antifoggants or stabilizers such as azoles [e.g., benzothiazolium salts, nitroimidazoles, nitrobenzimidazoles, chlorobenzimidazoles, bromobenzimidazoles, mercaptothiazoles, mercaptobenzothiazoles, mercaptobenzimidazoles, mercaptothiadiazoles, aminotriazoles, benzotriazoles, nitrobenzotriazoles, and mercaptotetrazoles (in particular, 1-phenyl-5-mercaptotetrazole)]; mercaptopyrimidines; mercaptotriazines; thioketo compounds (e.g., oxazolinethione); azaindenes [e.g., triazaindenes, tetraazaindenes (in particular, 4-hydroxy-substituted (1,3,3a,7)tetraazaindenes), pentaazaindenes, etc.]; benzenethiosulfonic acid, benzenesulfinic acid, benzenesulfonic acid, benzenesulfonic acid amide, etc.

As a binder or a protective colloid for the photographic silver halide emulsion for use in the present invention, gelatin is advantageously used but other hydrophilic colloids can be also used.

For example, proteins such as gelatin derivatives, graft polymers of gelatin and other polymers, albumin, casein, etc.; cellulose derivatives such as hydroxyethyl cellulose, carboxymethyl cellulose, cellulose sulfuric acid ester, etc.; saccharose derivatives such as sodium alginate, starch derivatives, etc.; and synthetic hydrophilic polymers (e.g., homopolymers and copolymers such as polyvinyl alcohol, polyvinyl alcohol partial acetal, poly-N-vinylpyrrolidone, polyacrylic acid, polymethacrylic acid, polyacrylamide, polyvinyl imidazole, polyvinyl pyrazole, etc.) can be used as the binder or protective colloid.

The photographic silver halide emulsion for use in the present invention may be spectrally sensitized by methine dyes, etc. Useful dyes for the spectral sensitization include cyanine dyes, merocyanine dyes, complex cyanine dyes, complex merocyanine dyes, holopolar cyanine dyes, hemicyanine dyes, styryl dyes, and hemioxonol dyes.

Particularly useful dyes include the dyes belonging to the class of cyanine dyes, merocyanine dyes, and complex merocyanine dyes.

The above described dyes can have a structure comprising a basic heterocyclic ring nucleus generally utilized for cyanine dyes. Examples of such nuclei include a pyrroline nucleus, an oxazoline nucleus, a thiazoline nucleus, a pyrrole nucleus, an oxazole nucleus, a thiazole nucleus, a selenazole nucleus, an imidazole nucleus, a tetrazole nucleus, a pyridine nucleus, etc.; nuclei formed by fusing an aliphatic hydrocarbon ring to the above-described nuclei, and nuclei formed by fusing an aromatic hydrocarbon ring to the above-described nuclei, such as an indolenine nucleus, a benzindolenine nucleus, an indole nucleus, a benzoxazole nucleus, an naphthoxazole nucleus, a benzothiazole nucleus, a naphthothiazole nucleus, a benzoselenazole nucleus, a benzimidazole nucleus, a quinoline nucleus, etc. The carbon atoms forming these nuclei may be substituted.

For merocyanine dyes or complex merocyanine dyes, a 5- or 6-membered heterocyclic nucleus such as a pyrazolin-5-one nucleus, a thiohydantoin nucleus, a 2-thiooxazolin-2,4-dione nucleus, a rhodanine nucleus, a thiobarbituric acid nucleus, etc., can be employed as a nucleus having a ketomethylene structure.

The sensitizing dyes may be used alone or in combination thereof. A combination of sensitizing dyes is frequently used for the purpose of super color sensitization.

The photographic silver halide emulsion may further contain a dye which does not provide a spectral sensitizing action by itself, or a substance which does not substantially absorb visible light but provides a super color sensitization effect when used together with a sensitizing dye.

Useful sensitizing dyes, combinations of dyes exhibiting the super color sensitization, and the substances exhibiting the super color sensitization are described in Research Disclosure, Vol. 176, Item 17643, page 23, IV-J (published December, 1978).

The photographic silver halide emulsion layer of the photographic light-sensitive material of the present invention may contain a color forming coupler, namely, compounds which form color by oxidative coupling with an aromatic primary amine developing agent (e.g., phenylenediamine derivatives, aminophenol derivatives, etc.) in color development processing.

For example, useful magenta coupler include 5-pyrazolone couplers, pyrazolobenzimidazole couplers, cyanoacetyl coumarone couplers, open chain acylacetonitrile couplers, etc.; useful yellow coupler include acylacetamide couplers (e.g., benzoylacetanilides and pivaloylacetanilides), etc.; and useful cyan coupler include naphthol couplers, phenol couplers, etc.

These couplers are desirably non-diffusible couplers each having a hydrophobic group called as a ballast group in the molecule. The couplers may be four-equivalent or two-equivalent to silver ion.

Also, the silver halide emulsion layer may contain a colored coupler having a color correction effect or a DIR coupler, i.e., a coupler which releases a development inhibitor upon development. Also, the emulsion layer may contain a non-coloring DIR coupling compound which provides a colorless product by a coupling reaction, and releases a development inhibitor in place of the DIR coupler.

For introducing a coupler into the silver halide emulsion layer, a known method such as the method described in U.S. Pat. No. 2,322,027 may be used.

For example, after dissolving the coupler in a high-boiling organic solvent such as a phthalic acid alkyl ester (e.g., dibutyl phthalate and dioctyl phthalate), phosphoric acid ester (e.g., diphenyl phosphate, triphenyl phosphate, tricresyl phosphate, and dioctylbutyl phosphate), citric acid ester (e.g., tributyl acetylcitrate), benzoic acid ester (e.g., octyl benzoate), alkylamides (e.g., diethyl laurylamide), fatty acid ester (e.g., dibutoxyethyl succinate and dioctyl azerate), trimesic acid ester (e.g., tributyl trimesate), etc., or a low boiling organic acid having a boiling point of from about 30° C. to 150° C., such as a low alkyl acetate (e.g., ethyl acetate and butyl acetate), ethyl propionate, secondary butyl alcohol, methyl isobutyl ketone, β-ethoxyethyl acetate, methylcellosolve, etc., the solution is dispersed in an aqueous hydrophilic colloid solution.

Also, a mixture of the high-boiling organic solvents and the low-boiling organic solvents may be used.

The photographic silver halide emulsion layers and other hydrophilic colloid layers of the photographic light-sensitive material of the present invention may contain an inorganic or organic hardening agent. Examples of the useful hardening agents include chromium salts (e.g., chromium alum and chromium acetate), aldehydes (e.g., formaldehyde, glyoxal, and glutaraldehyde), N-methylol series compounds (e.g., dimethylol urea and methyloldimethyl hydantoin), dioxane derivatives (e.g., 2,3-dihydroxydioxane), active vinyl compounds (e.g., 1,3,5-triacryloylhexahydro-s-triazine and 1,3-vinylsulfonyl-2-propanol), active halogen compounds (e.g., 2,4-dichloro-6-hydroxy-1,3,5-triazine), and mucohalogenic acids (e.g., mucochromic acid and mucophenoxychloric acid). The hardening agents can be used alone or in combination thereof.

Also, the photographic silver halide emulsion layer and other hydrophilic colloid layers of the photographic light-sensitive material of the present invention may further contain various surface active agents for use, e.g., as a coating aid, for static prevention, slidability improvement, improvement of dispersion by emulsification, to prevent sticking, and improvement of photographic characteristics (e.g., development acceleration, and increase in contrast and sensitivity).

The silver halide photographic emulsion for use in the present invention may contain other additives including, e.g., whitening agents, dyes, spectral sensitizers, desensitizers, hardening agents, coating aids, antistatic agents, plasticizers, lubricants, matting agents, development accelerators, oils, mordants, ultraviolet absorbents, fading inhibitors, and color fog inhibitors.

Additives for use in the present invention are described in *Research Disclosure*, No. 176, pages 22-31 (RD-17643) (Dec., 1978), etc.

The photographic silver halide emulsion layer and other layers of the photographic light-sensitive material of the present invention are coated on a flexible support such as a plastic film or papers generally employed for a photographic light-sensitive material.

Useful flexible supports, include films composed of semi-synthetic or synthetic polymers such as cellulose nitrate, cellulose acetate, cellulose acetate butyrate, polystyrene, polyvinyl chloride, polyethylene terephthalate, polycarbonate, etc., and papers laminated with a baryta layer or an α-olefin polymer (e.g., polyethylene, polypropylene, and an ethylene/butene copolymer). Further, supports as described in U.S. Pat. No. 4,954,838 can also be used in the present invention.

For preparing the photographic light-sensitive material of the present invention, the photographic silver halide emulsion layers and other hydrophilic colloid layers are coated onto the support or onto previously coated layers by various known coating methods. As useful coating methods include a dip coating method, a roller coating method, a curtain coating method, an extrusion coating method, a bead coating method, etc. The coating methods described in U.S. Pat. Nos. 2,681,294, 2,761,791, and 3,526,528 can be advantageously used.

The present invention can be applied to a multilayer multicolor natural color photographic light-sensitive material having at least two silver halide emulsion layers each having a different spectral sensitivity on a support.

A multilayer natural color photographic light-sensitive material generally has at least one red-sensitive emulsion layer, at least one green-sensitive emulsion layer, and at least one blue-sensitive emulsion layer on a support. The disposition order of these emulsion layers is selected depending on the particular application.

The red-sensitive emulsion layer generally contains a cyan-forming coupler, the green-sensitive emulsion layer generally contains a magenta-forming coupler, and the blue-sensitive emulsion layer generally contains a yellow-forming coupler but different combinations of couplers can also be employed.

The photographic light-sensitive material adaptable for processing in accordance with the present invention includes various kinds of color and black and white light-sensitive materials. For example, the present invention can be applied to color negative photographic films for photographing (general color negative films and motion picture films), color reversal photographic films (for slide, for motion picture, or as the case may be, containing no couplers), color photographic papers, color positive photographic films (for motion picture, etc.), color reversal photographic papers, color photographic light-sensitive materials utilizing a silver dye bleach image forming process, photographic light-sensitive materials for making printing plates (lithographic light-sensitive films, scanner films, etc.), radiographic light-sensitive materials (direct and indirect medical X-ray films, industrial X-ray films, etc.), black and white negative photographic films for photographing, black and white photographic papers, photographic light-sensitive micro films (for COM, micro films, etc.), etc. The effects of the present invention are most pronounced when applied to a light-sensitive material for photographing.

When the photographic light-sensitive material of the present invention is a color photographic material for photographing, it is preferable that the total sum of the layer thicknesses of all of the hydrophilic colloid layers on the emulsion layer side is not more than 28 μm, and the film swelling rate $T\frac{1}{2}$ is 30 seconds or less. The thickness is preferably not more than 25 μm and has $T\frac{1}{2}$ of preferably 20 seconds or less measured at 25° C. and a relative humidity of 55% (2 days). The film swelling rate $T\frac{1}{2}$ can be measured according to methods well known in the art. For example, the film swelling rate can be measured by using a swellometer of the type described in A. Green et al, *Photographic Science and Engineering*, Vol. 19, No. 2, pages 124-129. When a photographic light-sensitive material is processed by a color developer for 3 minutes and 15 seconds at 30° C., 90% of the maximum swelled film thickness attained in this case is defined as the saturated film thickness, and the time that it takes to reach ½ of the saturated film thickness is defined as $T\frac{1}{2}$.

The film swellinq rate $T\frac{1}{2}$ can be adjusted by adding a hardening agent to gelatin used as a binder, or by changing the condition (e.g., humidity and temperature) with the passage of time after coating the layers.

Also, the swelling ratio is preferably from 150 to 400%. The swelling ratio is calculated according to the formula $$(A-B)/B$$

A: Maximum swelled film thickness
B: Film thickness
from the maximum swelled film thickness under the condition described above.

For photographic processing of the photographic light-sensitive material of the present invention, known process and known processing solutions can be used. Also, the processing temperature is usually selected in the range of from 18° C. to 50° C., but the temperature may be lower than 18° C. or higher than 50° C. depending on the particular application.

According to the intended purpose, the present invention can be applied to black and white photographic processing, i.e., photographic processing for forming silver images or color photographic processing for forming color images. The processing process of the present invention can be used for all the processing steps of photographic processing, or for one step or two or more steps of the photographic processing sequence.

For a black and white developer, developing agents such as dihydroxybenzenes (e.g., hydroquinone), 3-pyrazolidones (e.g., 1-phenyl-3-pyrazolidone), aminophenols (e.g., N-methyl-p-aminophenol), etc., can be used alone or as a combination thereof.

The color developer for processing the color photographic light-sensitive material of the present invention is preferably an alkaline aqueous solution of an aromatic primary amine color developing agent as the main component. As the color developing agent, aminophenol series compounds are useful but p-phenylenediamine series compounds are preferably used. Typical examples thereof includes 3-methyl-4-amino-N,N-diethylaniline, 3-methyl-4-amino-N-ethyl-N-$\beta$-hydroxyethylaniline, 3-methyl-4-amino-N-ethyl-N-$\beta$-methanesulfonamidoethylaniline, 3-methyl-4-amino-N-ethyl-N-$\beta$-methoxyethylaniline, and the sulfates, hydrochlorides, or p-toluenesulfonates of these compounds. Two or more kinds of these compounds may be used depending on the intended application.

The color developer generally further contains a pH buffer such as a carbonate, borate and phosphate of an alkali metal, and a development inhibitor or an antifoggant such as a bromide, iodide, benzimidazole, benzothiazole, mercapto compound, etc.

Also, if necessary, the color developer may further contain a preservative such as hydroxylamine, diethylhydroxylamine, hydrazine sulfites, phenylsemicarbazides, triethanolamine, catecholsulfonic acids, triethylenediamine(1,4-diazabicyclo[2,2,2]octane), etc.; an organic solvents such as ethylene glycol, diethylene glycol, etc.; a development accelerator such as benzyl alcohol, polyethylene glycol, quaternary ammonium salts, amines, etc.; a dye-forming coupler; a competing coupler; a fogging agent such as sodium boron hydride, etc.; an auxiliary developing agent such as 1-phenyl-3-pyrazolidone, etc.; a tackifier; a chelating agent such as an aminopolycarboxylic acid, an aminopolyphosphonic acid, an alkylphosphonic acid, a phosphonocarboxylic acid, etc., (e.g., ethylenediaminetetraacetic acid, nitrilotriacetic acid, diethylenetriaminepentaacetic acid, cyclohexanediaminetetraacetic acid, hydroxyethyliminodiacetic acid, 1-hydroxyethylidene-1,1-diphosphonic acid, nitrilo-N,N,N-trimethylenephosphonic acid, ethylenediamine-N,N,N',N,-tetramethylenephosphonic acid, ethylenediamine-di(o-hydroxyphenylacetic acid) and the salts of these compounds), etc.

Also, in the case of practicing reversal processing, color development is usually carried out after black and white development. For the black and white developer, known black and white developing agents such as dihydroxybenzenes (e.g., hydroquinone), 3-pyrazolidones (e.g., 1-phenyl-3-pyrazolidone), and aminophenols (e.g., N-methyl-p-aminophenol) can be used alone or in combination thereof.

The pH of the color developer and black and white developer is generally from 9 to 12.

Furthermore, the compounds described in F. A. Mason, *Photographic Processing Chemistry*, pages 266–229, published by the Focal Press, 1966, U.S. Pat. Nos. 2,193,015 and 2,592,364 and JP-A-48-64933 may be used.

Furthermore, the developer can contain a pH buffer such as a sulfite, carbonate, borate, and phosphate of an alkali metal and a development inhibitor or an antifoggant such as a bromide, iodide, and organic antifoggant. Also, if necessary, the developer may further contain a hard water softener, a preservative such as hydroxylamine, etc., an organic solvent such as benzyl alcohol, diethylene glycol, etc., a development accelerator such as polyethylene glycol, quaternary ammonium salts, amines, etc., a dye-forming coupler, a competing coupler, a fogging agent such as sodium boron hydride, etc., an auxiliary developing agent such as 1-phenyl-3-pyrazolidone, etc., a tackifier, the polycarboxylic acid series chelating agents described in U.S. Pat. No. 4,083,723, and the antioxidants described in West German Patent Publication (OLS) 2,622,950.

After color development, the photographic silver halide emulsion layers are generally bleached. The bleach process may be carried out simultaneously with a fix process (bleach-fix process or blix process), or may be carried out separately from the fix process. Furthermore, for rapid processing, the blix process may be carried out after the bleach process. Moreover, the blix may be carried out using two baths continuously, a fix process may be carried out before the blix process, or a bleach process may be carried out after the blix process.

As a bleaching agent, compounds of polyvalent metals such as iron(III), cobalt(III), chromium(VI), copper(II), etc., peroxides, quinones, nitro compounds, etc., are useful. Typical examples of the bleaching agent include ferricyanides; bichromates; organic complex salts of iron(III) or cobalt(III), such as the complex salts thereof of aminopolycarboxylic acids such as ethylenediaminetetraacetic acid, diethylenetriaminepentaacetic acid, cyclohexanediaminetetraacetic acid, methyliminodiacetic acid, 1,3-diaminopropanetetraacetic acid, glycol ether diaminetetraacetic acid, etc., or citric acid, tartaric acid, malic acid, etc.; persulfates; bromates; permanganates; and nitrobenzenes. In these complex salts, aminopolycaroxylic acid iron(III) complex salts such as ethylenediaminetetraacetic acid iron(III) complex salt, etc., and persulfates are preferred for rapid processing and environmental considerations. Furthermore, the aminopolycarboxylic acid iron(III) complex salt is particularly useful as a bleach solution and a blix solution.

The pH of the bleach solution or blix solution containing an aminopolycarboxylic acid iron(III) complex salt is usually from 5.5 to 8, but the solution may have a lower pH for rapid processing.

The bleach solution, the blix solution and the prebath thereof may contain, if necessary, a bleach accelerator.

Examples of the useful bleach accelerator are compounds having a mercapto group or a disulfide group as described in U.S. Pat. No. 3,893,858, West German Patent 1,290,812, JP-A-53-95630, *Research Disclosure*, No. 17129 (July, 1978); thiazolidine derivatives described in JP-A-50-140129; thiourea derivatives described in U.S. Pat. No. 3,706,561; iodides described in JP-A-58-16235; polyoxyethylene compounds described in West German Patent 2,748,430; polyamine compounds described in JP-B-45-8836; and bromide ion.

In the above-described compounds, the compounds having a mercapto group or a disulfido group are preferred for providing a large acceleration effect and in particular, the compounds described in U.S. Pat. No. 3,893,858, West German Patent 1,290,812, and JP-A-53-95630 are preferred. Furthermore, the compounds described in U.S. Pat. No. 4,552,834 are also preferred.

The bleach accelerator may be incorporated in the photographic light-sensitive material. When a color photographic light-sensitive material for photographing is blixed, the use of a bleach accelerator is particularly effective.

Useful fixing agents include thiosulfates, thiocyanates, thioether series compounds, thioureas, a large quantity of iodide, etc., but a thiosulfate is generally used and, in particular, ammonium thiosulfate is most widely used.

As a preservative for the blix solution, sulfites, hydrogensulfites, sulfinic acids, or carbonyl-hydrogensulfite addition products are preferably used.

The silver halide color photographic material of the present invention is generally washed and/or stabilized after desilvering.

In processing of the color photographic light-sensitive material of the present invention, the method of reducing calcium ion and magnesium ion in the wash water as described in JP-A-62-288838 is effectively used. Also, the isothiazolone compounds described in JP-A-57-8542, thiabendazoles, chlorine series sterilizers such as chlorinated sodium isocyanurate, etc., benzotriazole, and the fungicides described in Hiroshi Horiguchi, *Bokin Bobaizai no Kagaku* (*Chemistry of Antibacterial and Antifungal Agents*), *Biseibutsu no Mekkin, Sakkin, Bobai Gijutsu* (*Bactericidal and Antifungal Technique of Microorganisms*), edited by Eisei Gijutsu Kai, and *Bokin Bobai Zai Jiten* (*Handbook of Antibacterial and Antifungal Agents*), edited by Nippon Bokin Bobai Gakkai can be used.

The pH of the wash water for processing the photographic light-sensitive material is from 4 to 9, and preferably from 5 to 8. The temperature and the time for the wash step is selected according to the characteristics and use of the photographic light-sensitive material, but are generally from 20 seconds to 10 minutes at a temperature of from 45° C. to 15° C., and preferably from 30 seconds to 5 minutes at a temperature of from 40° C. to 25° C.

Furthermore, the photographic light-sensitive material of the present invention can be directly processed with a stabilization solution in place of the wash water described above. For such a stabilization process, the known methods described in JP-A-57-8543, JP-A-58-14834, and JP-A-60-220345 can be used.

Also, after wash processing as described above, a stabilization process may be further applied. For example, the stabilization bath may contain formalin and a surface active agent for use as the final bath for the color photographic light-sensitive material for photographing. The stabilization bath can also contain a chelating agent and an antifungal agent.

The overflow liquid from replenishment of the wash water and/or the stabilization solution as described above can be utilized again in the desilvering step, etc.

The silver halide color photographic material of the present invention may contain a color developing agent for simplifying and accelerating processing. For incorporating a color developing agent in the light-sensitive material, it is preferred to use a precursor of the color developing agent. Examples thereof are the indoaniline series compounds described in U.S. Pat. No. 3,342,597, Shiff base type compound described in U.S. Pat. No. 3,342,599 and *Research Disclosure*, No. 14850, and ibid., No. 15159, aldol compounds described in *Research Disclosure*, No. 13924, metal complexes described in U.S. Pat. No. 3,719,492, and urethane series compounds described in JP-A-53-135628.

Also, the silver halide color photographic material of the present invention may, if necessary, contain various kinds of 1-phenyl-3-pyrazolidones for the purpose of accelerating the color development. Typical examples of such compounds are described in JP-A-56-64339, JP-A-57-144547, and JP-A-58-115438.

The various processing solutions in the processing process of the present invention are used at a temperature of from 10° C. to 50° C. A standard temperature of the processing solution is generally from 33° C. to 38° C., but a higher temperature may be employed for accelerating processing to shorten the processing time, or a lower temperature may be employed for improving the image quality and improving the stability of the processing solutions.

Also, for saving silver in the photographic light-sensitive material, a processing process using cobalt intensification or hydrogen peroxide intensification as described in West German Patent 2,226,770 and U.S. Pat. No. 3,674,499 may be practiced.

As described above, according to the method of the present invention, the amount of the processing solution used is greatly reduced. Furthermore, stable photographic performance and good performance is obtained.

Also, in accordance with the processing method of the present invention, stable photographic characteristics are obtained in low utilization processing. Furthermore, uniform photographic performance is obtained in the lengthwise direction of a long photographic light-sensitive material.

The present invention is further described below by reference to the following non-limiting examples.

EXAMPLE 1

A color negative photographic film (Sample 1) was prepared according to the method described in Example 5 of JP-A-63-70857. The film was cut to 35 mm in width and 1 meter in length, and bosses were formed at both the margin portions along two lines each with the emulsion layer as the upper surface using a knurl roller (rotary embossing means for kimono dressmaking) as shown in FIG. 13 without forming perforations.

The photographic film was swirlingly wound. The cross sectional view of the wound state and the cross sectional view of the film in a plane state are also shown in FIG. 13 together with the plan view of the film. As shown in the plan view, projections 3 were formed in a straight line on the photographic film 2 at other portions than image portions 1, that is, at both of the margin portions.

Figure 13A:
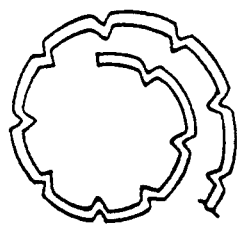
FIG. 13A is a sectional view showing the form of swirlingly winding the silver halide photographic material having bosses, the intermediate
Figure 13B:
FIG. 13B is a sectional side view showing the form of the bosses of a silver halide photo material of the present invention, and the lower
Figure 13C:
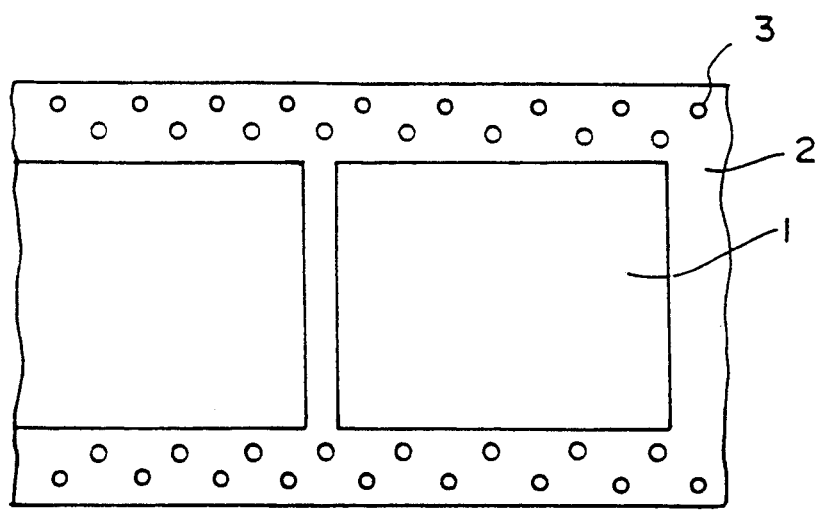
FIG. 13C is a plan view of the silver halide photographic material having bosses.
Figure 14A:
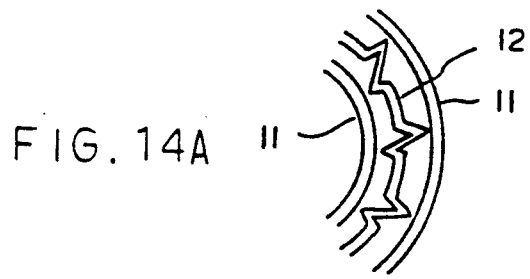
FIG. 14A is a sectional side view showing the form of swirlingly winding the silver halide photographic material together with a dummy film having projections, the intermediate
Figure 14B:
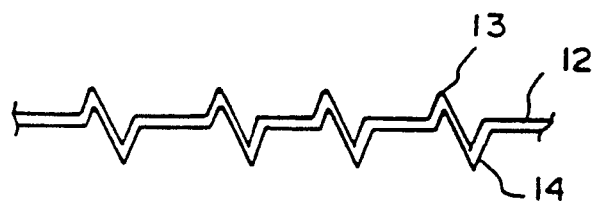
FIG. 14B is a frictional side view of the dummy film, and the lower
Figure 14C:
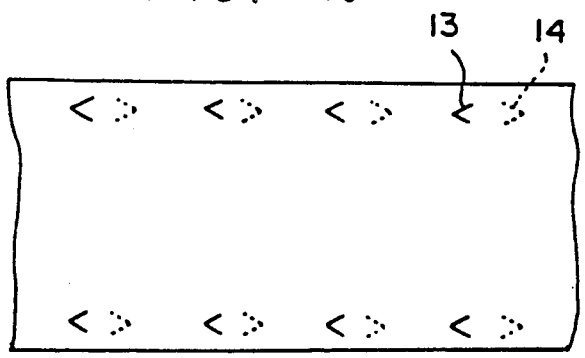
FIG. 14C is a plan view of the dummy film having projections wherein convex 13 is provided on the frontside of the film and convex 14 is provided on the backside of the film and they are illustrated as < and > (dotted line), respectively, in the lower figure.

Alternatively, in place of the photographic light-sensitive film shown in FIG. 13, a dummy film (spacer) 12 shown in FIG. 14 having projections 13 and 14 at both the margin portions can be inserted (or wound together with) the light-sensitive film 11 to form gaps as shown in FIG. 14. The cross sectional view of the swirlingly wound photographic film 11 having inserted therebetween the dummy film or spacer 12 and the cross sectional view of the dummy film 12 are shown in FIG. 14 together with a plan view of the dummy film 12 having projections 13 and 14 at both surface sides of the film.

The diameter and the height of each boss was 0.5 mm and 0.17 mm, respectively, and the bosses were formed with an interval of 2 mm. The bosses in a first margin line were formed at a distance of 1.5 mm from each edge of the film and the bosses in a second line were formed at a distance of 3.5 mm from each edge of the film.

After photographing using a compact camera (as "Utsurundesu" (equal to "Quick Snap"), trade name, made by Fuji Photo Film Co., Ltd.) wherein the wind-up portion is modified, the film was packed in a processing container shown in FIG. 17 and then processed by the processing steps using the processing solutions described below. The volume of each processing solution in the processing container was about 10 ml and the volume of the processing solution in the pipes was about 1.5 ml.

The processing steps were as follows.

| Step | Processing Time | Processing Temperature |
|---|---|---|
| Color Development | 3' 15" | 38° C. |
| Bleach | 1' 00" | 38° C. |
| Blix | 3' 15" | 38° C. |
| Wash | 1' 40" | 35° C. |
| Stabilization | 40" | 35° C. |

| Color Developer | |
|---|---|
| Diethylenetriamine pentaacetic acid | 1.0 g |
| 1-Hydroxyethylidene-1,1-diphosphonic acid | 2.0 g |
| Sodium sulfite | 4.0 g |
| Potassium carbonate | 30.0 g |
| Potassium bromide | 1.4 g |
| Potassium iodide | 1.3 mg |
| Hydroxylamine | 2.4 g |
| 4-(N-ethyl-N-β-hydroxyethylamino)-2-methyl aniline sulfate | 4.5 g |
| Water to make | 1 liter |
| | pH 10.00 |

| Bleach solution | |
|---|---|
| Ammonium bromide | 100 g |
| Ammonium ethylenediaminetetraacetic acid iron (III) | 120 g |
| Ethylenediaminetetraacetic acid disodium salt | 10.0 g |
| Ammonium nitrate | 10.0 g |
| Bleach accelerator having the following structure | 2.0 g |

$$H_3C\diagdown N-(CH_2)_2-S-S-(CH_2)_2-N\diagup CH_3$$
$$H_3C\diagup \qquad \diagdown CH_3$$

| | |
|---|---|
| Aqueous ammonia | 17.0 ml |
| Water to make | 1 liter |
| | pH 6.5 |

| Bleach-fix solution | |
|---|---|
| Ammonium bromide | 50.0 g |
| Ammonium ethylenediaminetetraacetic acid iron (III) | 50.0 g |
| Ethylenediaminetetraacetic acid disodium salt | 5.0 g |
| Ammonium nitrate | 5.0 g |
| Sodium sulfite | 12.0 g |
| Aqueous solution of ammonium thiosulfate (70%) | 240 ml |
| Aqueous ammonia | 10.0 ml |
| Water to make | 1 liter |
| | pH 7.3 |

Washing water
Tap water having the following water quality:

| pH | 7.1 |
|---|---|
| Calcium ion | 23 mg/liter |
| Magnesium ion | 8 mg/liter |

| Stabilizing solution | |
|---|---|
| Formalin (37% w/v) | 2.0 ml |
| Polyoxyethylene-p-monononylphenylether (average degree of polymerization 10) | 0.3 g |
| Water to make | 1 liter |

Figure 16:
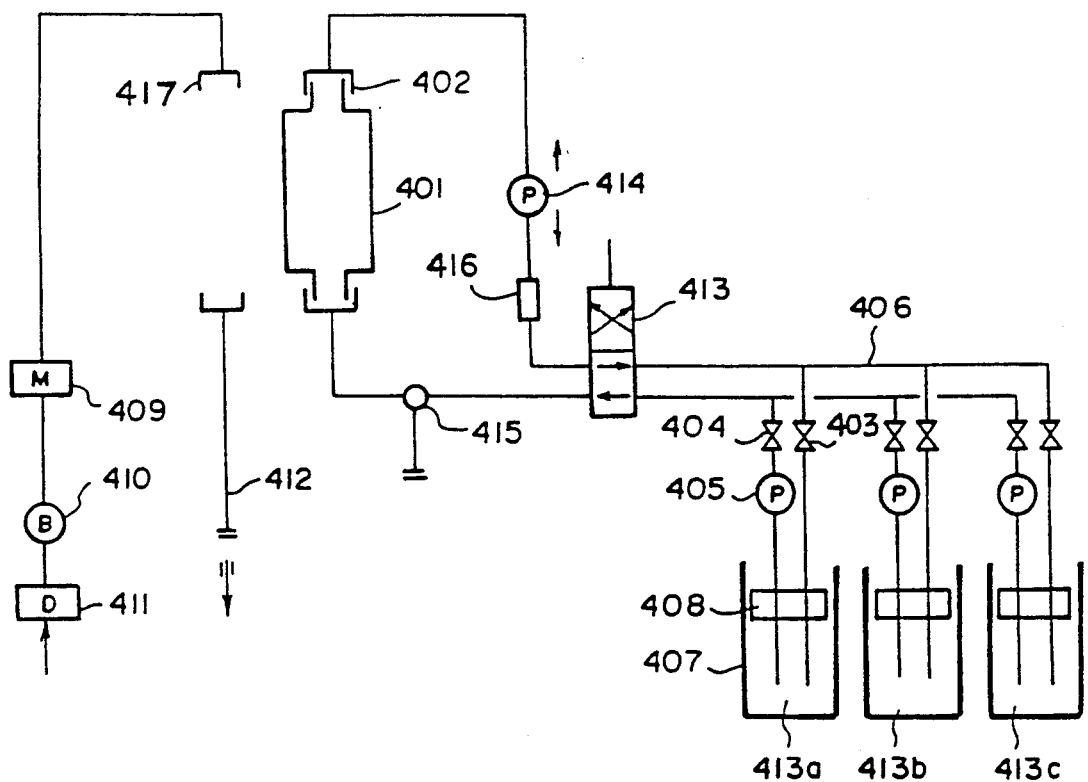
FIG. 16 is a schematic diagram of a processing apparatus in accordance with the present invention.
Figure 17:
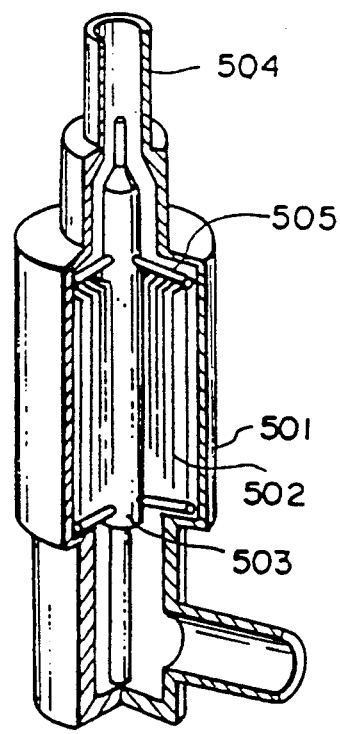
FIG. 17 is a partially cut slant view showing the inside of a processing container case for roll-form photographic light-sensitive materials in accordance with the present invention.

For processing, the processing apparatus shown in FIG. 16 and the processing container shown in FIG. 17 were used, and the light-sensitive material in the processing container was processed while moving about 20 ml of the processing solution upward and downward each time per 15 seconds. This state is explained using FIG. 16 and FIG. 17.

As shown in FIG. 17, the imagewise exposed light-sensitive material 502 is swirlingly wound around axis 503 by attaching the end of the light-sensitive material 502 to the axis 503. The processing container case 501 is held by frames 505 such that the light-sensitive material 502 is immobile and a pipe for supplying a processing solution is connected to a coupler (coupling means) 504. The container case 501 and the coupler 504 in FIG. 17 correspond to a container case 401 and a coupler 402 in FIG. 16, respectively.

FIG. 16 is a schematic view of a processing system in accordance with the present invention. The container case 501 shown in FIG. 17 is coupled with each of processing solutions (413a, 413b, and 413c derived from 413) and the drying portions (409, 410, and 411) in FIG. 16 by means of the coupler 504 in FIG. 17.

In FIG. 16, a container case 401 containing an imagewise exposed swirlingly wound light-sensitive material is connected to a 1st processing solution 413a by a coupler 402, change-over valves 403 and 404, and a liquid supply pump 405 through a pipe 406 to fill the container with the 1st processing solution 413a.

While heating the solution with a heater 416, a processing pump 414 is operated in a first direction to send the processing solution to the container and then reversely operated to move the processing solution in the opposite direction to process the light-sensitive material in the container. After processing, a waste liquid discharging cock 415 is opened to discharge the processing solution in the container case 401.

Similarly, the light-sensitive material in the container 401 is successively processed with a 2nd processing solution 413b and then a 3rd processing solution 413c, etc.

Each processing solution is stored in a tank 407 in a manner such that the solution is negligibly deteriorated with the passage of time by means of a floating lid 408.

Then, the coupler 402 is changed to a coupler 417 for drying mode (409, 410, 411, and 412). Namely, open air is dehumidified by a desiccator 411 and while heating by a heater 409, the hot, dehumidified air is sent to the container case 401 by means of a blower 410 and discharged through a duct 412.

FIG. 17 is slant view showing the inside of the container 501. The container 501 is a container for processing and drying the light-sensitive material 502. In the container 501 is packed the light-sensitive material 502 in a wound state with a constant gap between the adjacent films.

The coupler 504 is for connecting the container to each processing solution and a drying system.

The light-sensitive material 502 is wound around a central axis 503, which is disposed at the center of the processing container case 501.

The light-sensitive material 502 is embossed at both the margin portions to form gaps when the light-sensitive material is wound, or if the light-sensitive material 502 has no bosses, gaps are formed by using a dummy film or spacer having bosses as described above.

The frames 505 hold the light-sensitive material 502 in place such that the light-sensitive material does not move up and down vigorously during processing and drying.

The processing solution is automatically discharged by air pressure after processing and then a next processing solution is supplied to the container for processing.

After processing, the coupler 504 is exchanged and dehumidified air is passed through the processing container at 3.5 liters/min. while changing the flowing direction of air once every 15 seconds. After about 2 minutes of drying, the photographic film is removed from the container and when each image formed is printed on a color paper by a conventional color printer, good prints having excellent quality images in sensitivity and gamma without the increase of fog or stain are obtained.

Furthermore, each of the color developer, the blix solution, and fix solution stock tanks 407 in FIG. 16 was protected from exposure to the ambient air by a floating lid. When the light-sensitive film described above was processed for 3 months at a rate of one film per a week, the finished photographic performance was unchanged as shown in FIG. 15.

Also, when color negative films of 135 mm width containing 24 films were subjected to running processing at a rate of 20 films per day using a Mini-Labo FP-350AL (CN-16Q processing step) made by Fuji Photo Film Co. Ltd., the finished photographic performance was constant for 3 months. On the other hand, when color negative films were subjected to running processing in the same manner in low utilization processing at a rate of one film per a week, a very hard gamma (finished performance) was obtained after about one month.

Figure 15:
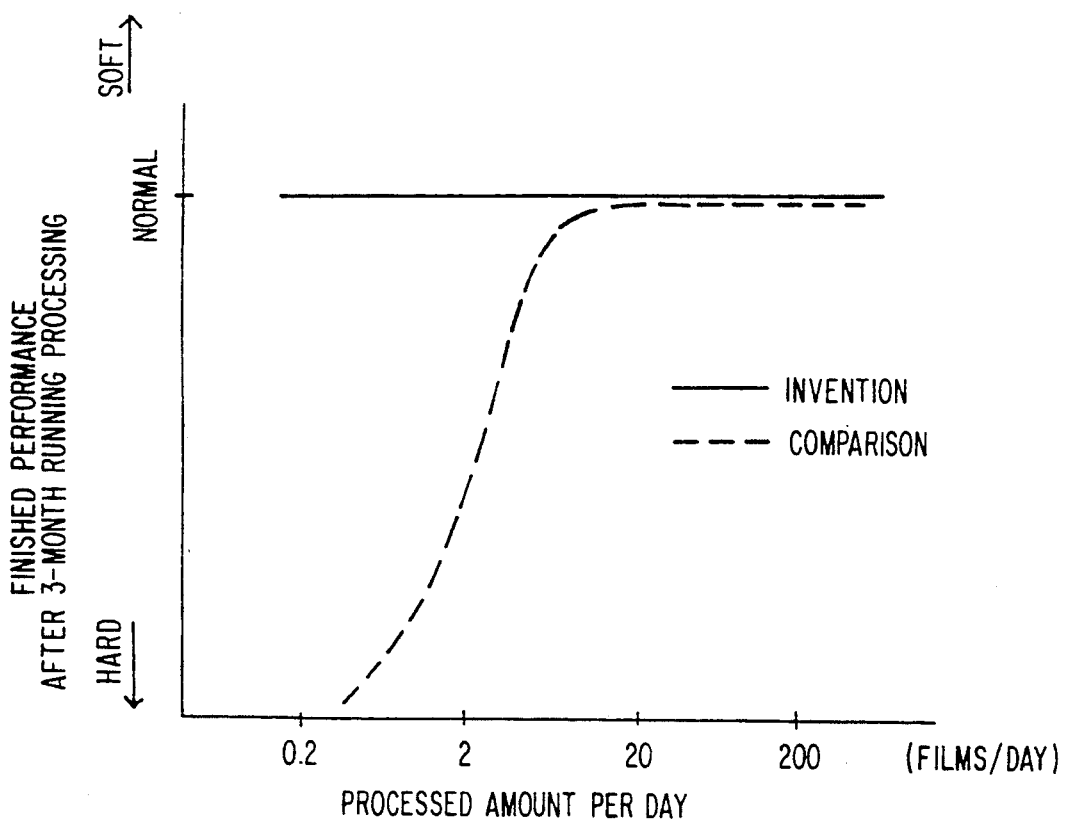
FIG. 15 is a graph schematically showing the finished performance of processing after 3-month running processing as a function of the processed amount per day.

The results are shown in FIG. 15.

Then, for comparison, color negative films processed by a round tank processor using a Nikor-type developing tank resulted in an amount of waste solution about 20 times larger than that of the processing method of the present invention. Furthermore, the finished colors of prints thus obtained exhibited a wide variation due to a large processed finish unevenness. Also, when the processing was carried out by a replenishing system for reducing the amount of the waste solution, the variation of the color of prints was ever larger.

From the above results, it is clearly seen that as compared to the mini-labo, the present invention provides stable finished performance independent of the processing amount per day as shown in FIG. 15. In other words, even in so-called low utilization processing (e.g., processing of 5 or less films per day), stable photographic performance is obtained. Furthermore, in regard to, e.g., the developer alone, the amount supplied for developing one light-sensitive material is reduced from 45 ml to 25 ml, which results in reduced cost as well as the amount of the waste solution.

Furthermore, as compared to a Nikor-type round developing tank system, the present invention provides both a stable processed finish and the amount of waste solution is about 1/20 that of the Nikor system.

EXAMPLE 2

Imagewise exposed black and white films, i.e., the Sample 1 (light-sensitive material) of Example 1 of JP-A-106050, were processed using the processing system shown in FIG. 16. The sample film was developed for 4 minutes and 15 seconds at 20° C. with Super Prodol (SPD) (developer, made by Fuji Photo Film Co., Ltd.), and then processed for 4 minutes and 15 seconds at 20° C. with Super Fuji Fix (fix solution, made by Fuji Photo Film Co., Ltd.), and further processed for 4 minutes and 15 seconds with wash water.

Thereafter, the film thus processed was printed on Fuji Bromide #3 (black and white photographic paper, made by Fuji Photo Film Co., Ltd). Beautiful prints having good gradation were obtained as in the case of ordinary processing of negative films.

The processing container shown in FIG. 17 as used in Example 1 was also employed herein.

Also, after developing an imagewise exposed light-sensitive material (black and white photographic film) with SPD for one minutes at 30° C. in the container case 501, the film was processed for 1 minute with Super Fuji Fix, and washed with wash water for one minute. Beautiful prints having good gradation were similarly obtained.

When 10 photographed films were processed by the above-described rapid processing system, a stable finish (e.g., ASA 100±10) was constantly obtained.

On the other hand, for comparison, after developing the imagewise exposed film by an experienced operator for 2 minutes and 30 seconds using a Darkless developing device and developing chemical kit Al, made by Fuji Photo Film Co., Ltd., the film was fixed for 4 minutes at 25° C. and then the film removed therefrom was washed with water by an ordinary system and then dried. Thus, beautiful prints having good gradation, good grain properties and good sharpness were obtained as in the ordinary case of processing negative films in mini-laboratories.

However, when 10 black and white imagewise exposed films were processed in the same manner as described above (Darkness developing device), it was necessary to change the exposure condition for the last print to obtain similarly beautiful prints.

When an imagewise exposed black and white film was processed by the same manner as described above by an inexperienced operator (i.e., experience of not more than 10 processing trials), uneven processing due to bubbles and film adhesion problems were encountered. Thus, it is clearly seen processing in accordance with the darkless system results in a large processing variation even when operated by an experienced person and despite employing a relatively low processing temperature and long processing time. On the other hand, the present invention provides stable performance even when using high-temperature and rapid processing. Accordingly, the processing process of the present invention is considered to possess excellent and rapid processing aptitude.

EXAMPLE 3

Fuji Color Super HG 400 120 size film (made by Fuji Photo Film Co., Ltd.) was cut in 35 mm width, embossed as in Example 1, and after imagewise exposure was processed by the processing system shown in FIG. 16 as in Example 1 using Mini-labo processing agent CN-16Q for color negative film, made by Fuji Photo Film Co., Ltd. Beautiful color prints having clear colors were thus obtained.

Since the processor of FIG. 16 is a small-sized apparatus, it can be transported to a photographing location by car, and the imagewise exposed photographic film can be processed at the photographing location as well as unevenness of processing as in the round tank development was less.

EXAMPLE 4

After imagewise exposing Fuji Color Super HG 400 135, 24 frame film, made by Fuji Photo Film Co., Ltd., the film was superposed on a triacetyl cellulose (dummy) film having a 35 mm width and projections (diameter 0.9 mm, height 0.2 mm, and interval of 2.5 mm) at the margin portions at 2 mm from the edge on both the surface sides thereof as shown in FIG. 14. The films were swirlingly wound together to form gaps between the light-sensitive material and adjacent dummy film and processed by the system shown in FIG. 16. In this case, however, the capacity of the processing container was larger than that in Example 1 due to the presence of dummy film although the amount of the processing solution was same as that in Example 1. Prints having clear colors as in Example 1 were obtained.

EXAMPLE 5

The light-sensitive material in Example 1 of JP-A-1-93737 was cut into dental X-ray films (30 mm×40 mm, 4 corners were roundly cut). After a dental X-ray exposure of the light-sensitive material, the margin portions of each film were embossed (diameter 0.5 mm, height 0.2 mm, interval 3 mm). The films were both developed and fixed using the container of FIG. 18 and the processing system of FIG. 16 using the processing solutions of Example 1 of JP-A-1-93737 (a developer containing 2.5 g/l of Exemplary Compound I-(5)) for 25 seconds at 35° C., a Fuji F Fix solution, made by Fuji Photo Film Co., Ltd. for 25 seconds, water wash for 25 seconds, and drying for 25 seconds at 55° C.

Figure 18:
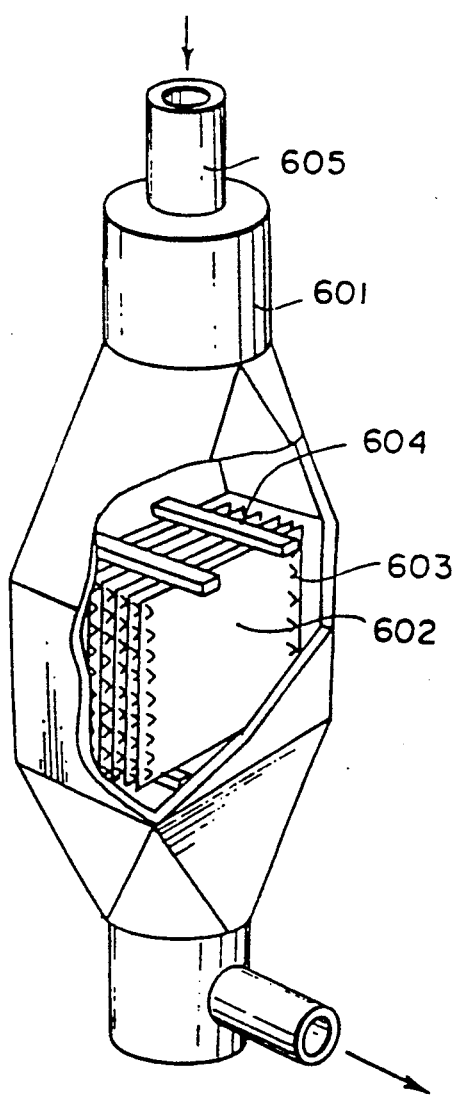
FIG. 18 is a partially cut slant view showing a processing container for sheet-form photographic light-sensitive materials in accordance with the present invention.

FIG. 18 is a slant view showing the inside of a sheet film processing container. Light-sensitive materials 602 each having bosses 603 are perpendicularly superposed with each other to form a gap between each material, which light-sensitive materials are fixed by frames 604 at the upper and lower direction and placed in the container 601. The container 601 is connected to a processing solution or a drying system through a coupler 605.

Since the light-sensitive materials are always processed using a fresh processing solution, even in low utilization processing, consistently stable processing performance is obtained.

For comparison, dental films were attached to a guide film and processed using a Fuji Medical Processor FPM 60 (made by Fuji Photo Film Co., Ltd.). Since the processor FPM60 was used for low utilization processing, the repeated processing performance was unstable.

EXAMPLE 6

Industrial X-ray film Non-Screen Type #80 (super fine grain type), made by Fuji Photo Film Co., Ltd. was cut in a size of 60 mm×180 mm, and after appropriate exposure (see, Fuji Film Technical Handbook, "Fuji Industrial X-Ray Film"), the films were processed using a container of FIG. 19. The films were developed for one minute at 33° C. using Hi Rendol I (made by Fuji Photo Film Co., Ltd.) as a developer, fixed for one minute at 33° C. using Fuji F (made by Fuji Photo Film Co., Ltd.) as a fix solution, and washed for one minute at 3° C.

For comparison, the films were also processed by the FPM 60 (developer 4 liters, fix solution 4 liters) processor used in Example 5.

In each case, stable processing performance was obtained with high utilization processing. However, when low utilization processing was conducted in the FPM processor (film processing of about once per week), the process of the present invention was clearly not influenced by the low utilization processing but the variation in processing performance was large in the case of the low utilization FPM 60 processing.

FIG. 19b is a slant view showing the inside of a processing container for industrial X-ray films. Also, FIG. 19a is an enlarged view showing the positional relation of groove 708 and light-sensitive material 702 in FIG. 19b.

Grooves are formed at the left and right side walls of the container and when light-sensitive materials are inserted in the grooves, the light-sensitive materials are supported in a bent state and a gap 710 is formed between adjacent light-sensitive materials. Also, the upper and the lower positions are fixed by frames 704. The container 701 is connected to a processing solution or a drying system through a coupler 705.

As described above, by successively supplying a developer, a fix solution, and wash solution from upper to lower of the container, each film is effectively processed in the gap between the films. In FIG. 19a, 711 shows an external body of the container.

EXAMPLE 7

Color photographic papers prepared in accordance with Example 1 of JP-A-63-70857 were subjected to running processing using Color Paper Printer Processor PP600 of Champion 23S (made by Fuji Photo Film Co., Ltd.) with the processing steps and the processing solutions of Example 1 of JP-A-63-70857. When very low utilization processing of about once a week was carried out, the processing performance, particularly sensitivity of the prints after 2 months was considerably deteriorated.

On the other hand, when the color photographic papers were processed by the processing process of the present invention shown in FIG. 16, in the very low utilization processing as described above, stable processing performance was consistently obtained. The container of FIG. 16 and the processing system of FIG. 17 were employed in a manner similar to that of Example 1.

EXAMPLE 8

After exposing Fuji Bromide Museum Mat Double weight D3 (intermediate gradation), made by Fuji Photo Film Co., Ltd., the photographic papers were developed by a tray developing system at 20° C., for 90 seconds with Development Korectol (made by Fuji Photo Film Co., Ltd.), stopped for 15 seconds, fixed for 5 minutes with Fuji Fix (made by Fuji Photo Film Co., Ltd.), pre-washed for one minute, subjected to wash acceleration bath QW (made by Fuji Photo Film Co., Ltd.), washed with water for 20 minutes, and image-stabilized for one minute with Fuji Ag Guard (made by Fuji Photo Film Co., Ltd.). When the operation was repeated several times, photographs having a constant density were not obtained and hence density correction was required by the printer.

On the other hand, when the photographic papers were processed using the processing system of FIG. 16 by a processing solution supplying method of Example 1, stable processing performance was consistently obtained and printer density correction was not required.

The processing system of FIG. 16 and the processing container of FIG. 17 were employed in a manner similar to that of Example 1.

EXAMPLE 9

Figure 20:
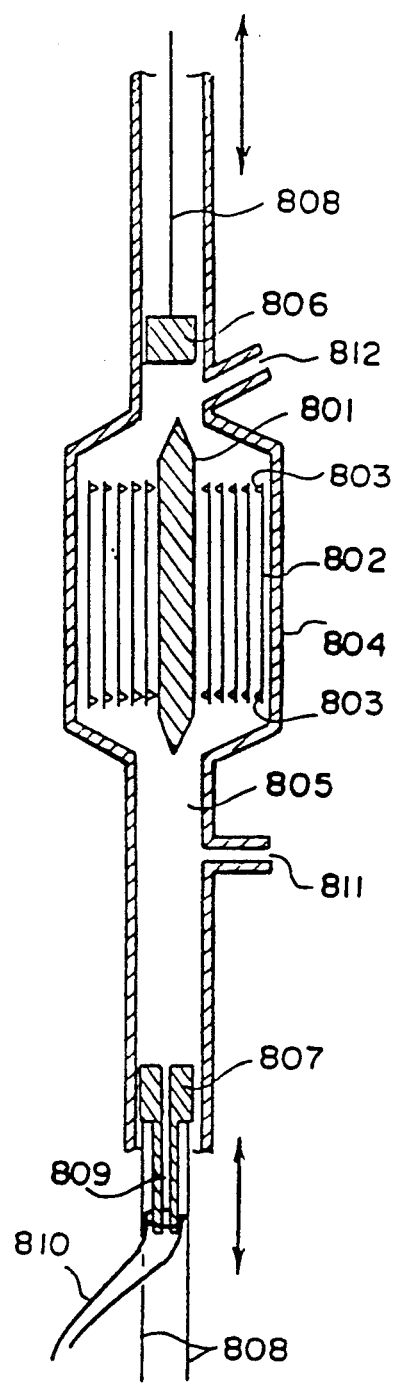
FIG. 20 is a schematic sectional view showing another example of a processor for use in the present invention.

The film container of FIG. 20 was equipped at the upper and lower portions thereof with pistons (injection type) to move the processing solution upward and downward through the gaps.

The end of a photographic film 802 is attached to a part of core 801 and swirlingly wound around the core to form gaps of a constant size by bosses 803 as shown in FIG. 13. After packing the film in a processing container 804, a processing solution is supplied from a liquid inlet 811. In this case, a liquid discharging route 809 is closed and when piston 806 is raised, the processing solution is automatically supplied to the processing container 804 from the inlet.

Thereafter, the inlet 811 was closed and when pistons 806 and 807 are moved together upward or downward, the processing solution was stirred and passed through the gaps to initiate processing. After a predetermined time, the liquid discharging route 809 is opened, the piston 807 is moved upward, and the piston 806 is moved downward to discharge the processing solution.

Then, an air inlet 812 is opened, the piston 806 is moved upward, then the air inlet 812 is closed, and the piston 806 is moved downward to discharge further the processing solution. Then, a second processing solution is supplied into the container in the same manner as described above to perform similar processing. In FIG. 20, 805 is a processing area, 808 is an axis of piston, and 810 is a rubber tube connecting between the discharging nozzle and an external member.

In this case, the amount of the processing solution in the film processing container was 8 ml and the amount of the processing solution in the upper and lower piston was about 10 ml. Thus, by processing with the process of the present invention, one color negative film can be processed with only 18 ml of a processing solution. The color negative film of Example 1 was processed using the container of FIG. 20, the processing system of FIG. 16 and the processing compositions and sequence of Example 1. The resulting sensitivity was low but processing having very good reproducibility was obtained. In this case, when the photographic films were processed using the replenishers described in Example 5 of JP-A-63-70857, processing having slightly higher sensitivity than ordinary processing as employed in mini-laboratories and good reproducibility were obtained without forming development fog.

EXAMPLE 10

Sample No. 2 in Example 7 of JP-A-63-70857 was prepared and processed to cut in 35 mm width without perforation, and then it was photographed by a special camera. Thereafter, the sample was bossed so that concave portions are formed along two lines at each margin portion as shown in FIG. 8. The bosses had the shape as shown in FIG. 11 with the bottom being circular form and had a height H of 0.25 mm, and a diameter of the bottom of 0.2 mm. The interval L was 2.5 mm. The thus obtained sample was wound around a core as shown in FIG. 12 and placed in a processing container as shown in FIG. 20.

Processing (A)

The sample in the processing container was developed by using a developing solution shown below for 3 minutes and 15 seconds at 38° C., and then the development was stopped with 3% acetic acid.

| Developing solution | |
|---|---|
| Diethylenetriamine pentaacetic acid | 1.1 g |
| 1-Hydroxyethylidene-1,1-diphosphonic acid | 2.2 g |
| Sodium sulfite | 4.4 g |
| Potassium carbonate | 39.0 g |
| Hydroxylamine | 2.6 g |
| 4-(N-ethyl-N-β-hydroxyethylamino)-2-methyl aniline sulfate | 5.0 g |
| Water to make | 1 liter |

| -continued | |
|---|---|
| Developing solution | |
| | pH 10.27 |

Thereafter, the sample film was taken out from the container, and it was subjected to the processing steps subsequent to N2 of the CN-16 standard processing as vat processing. In the development step, 20 ml of the processing solution was supplied to the container per film of 35 mm width and 1.1 m length, and the flow direction was alternately changed by moving the pistons equipped with the container together upward or downward. It was found that streaks corresponding to the stream of solution were caused in the emulsion surface corresponding to the bossed portions.

Processing (B)

In the same manner as in Processing (A) described above, except that the action of moving the core in the processing container was further added to the development step, wherein the core was alternately rewound and wound at ⅓ rotation each 15 seconds, Processing (B) was conducted.

It was found that no streak was caused in the film sample. Further, when a photographed image was printed on color paper, the thus obtained print had no defect.

While the invention has been described in detail and with reference to specific embodiments thereof, it will be apparent to one skilled in the art that various changes and modifications can be made therein without departing from the spirit and scope thereof.

What is claimed is:

1. A method for processing a silver halide photographic material comprising a support and a light-sensitive silver halide emulsion layer provided on the frontside of the support, said photographic material being arranged in a processing container containing a processing solution to form a gap or series of continuous gaps adjacent to the surface of the light-sensitive layer between the frontside of the photographic material and the backside of the same photographic material, or between the frontside of the photographic material and a second photographic material, or between the frontside of the photographic material and a light-insensitive member, said gap or continuous series of gaps having a substantially constant gap width, the gap width being within the range of from 0.05 mm to 2 mm, comprising the steps of introducing a processing solution stream into each gap by applying positive pressure or suction to the processing solution external to the gap, and replacing the processing solution thus introduced in an amount at least equivalent to the capacity of the gaps, wherein the stream direction of the processing solution is reversed from 3 to 100 times during the course of a single processing step.

2. A method as in claim 1, wherein the processing solution stream is introduced into each gap in the widthwise direction of the photographic material.

3. A method as in claim 1, wherein said photographic material is in the form of a long roll size having periodical projections along both margin portions thereof on one side of the support, said photographic material is swirlingly wound to form a continuous series of gaps adjacent to the light-sensitive layer between the frontside and backside of the photographic material, and the processing solution stream is introduced and replaced in a direction substantially perpendicular to the lengthwise direction of the photographic material.

4. A method in claim 1, wherein said photographic material is in the form of a long roll size, said photographic material is swirlingly wound together with a light-insensitive member also in the form of a long roll size and having periodical projections on both sides thereof to form a series of continuous gaps adjacent to the light-sensitive layer between the frontside of the photographic material and the light-insensitive member, and the processing solution stream is introduced and replaced in a direction substantially perpendicular to the lengthwise direction of the photographic material.

5. A method as in claim 1, wherein said photographic material is in the form of a sheet having periodical projections along both margin portions thereof on one side of the support, and said photographic material is superposed with a second such photographic material to form a gap adjacent to the light-sensitive layer between the frontside of the first photographic material and the backside of the second photographic material.

6. A method as in claim 1, wherein said processing container has parallel grooves on opposing sides of the inner surface thereof, said photographic material is in the form of a sheet, said photographic material and a second such photographic material are inserted into adjacent sets of grooves to form a gap adjacent to the light-sensitive layer between the frontside of the first photographic material and the second photographic material.

7. A method as in claim 1, wherein the processing solution stream is replaced in an amount of from 1 to 100 equivalents.

8. A method as in claim 1, wherein the direction of flow of said processing stream introduced into each gap is reversed in the replacement step.

9. A method as in claim 1, further comprising discharging the processing solution from the processing container, supplying a second different processing solution to the processing container, introducing a processing solution stream of said second processing solution into each gap and replacing the processing solution thus introduced in an amount at least equivalent to the capacity of the gaps.

10. A method as in claim 1, wherein said photographic material is a light-sensitive material for photographing comprising a support in the form of a long roll size having provided thereon at least one photosensitive silver halide emulsion layer, said light-sensitive material having plural intermittent projections at both the left and right hand parallel margin portions along the lengthwise direction of the light-sensitive material.

11. A method as in claim 1, wherein the processing solution is a developing solution.

12. A method as in claim 1, wherein the processing solution is replaced by changing the direction of the stream of the processing solution.

13. A method as in claim 1, wherein the processing solution is replaced by supplying the stream of the processing solution in a constant direction.

14. A method as in claim 1, wherein the stream direction of the processing solution is reversed from 4 to 10 times during the course of a single processing step.

15. A method as in claim 1, wherein the gap width is within the range of from 0.05 mm to 0.5 mm.

* * * * *